United States Patent
Lin et al.

(10) Patent No.: US 10,545,242 B2
(45) Date of Patent: Jan. 28, 2020

(54) SYSTEMS AND METHODS FOR IN-FRAME SENSING AND ADAPTIVE SENSING CONTROL

(71) Applicant: Apple Inc., Cupertino, CA (US)

(72) Inventors: Hung Sheng Lin, San Jose, CA (US); Hyunwoo Nho, Stanford, CA (US); Jie Won Ryu, Sunnyvale, CA (US); Junhua Tan, Santa Clara, CA (US); Sun-Il Chang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 123 days.

(21) Appl. No.: 15/670,860

(22) Filed: Aug. 7, 2017

(65) Prior Publication Data

US 2018/0074199 A1    Mar. 15, 2018

Related U.S. Application Data

(60) Provisional application No. 62/394,595, filed on Sep. 14, 2016.

(51) Int. Cl.
*G01S 17/36* (2006.01)
*G01S 7/481* (2006.01)
(Continued)

(52) U.S. Cl.
CPC ............ *G01S 17/36* (2013.01); *G01S 7/4816* (2013.01); *G01S 17/89* (2013.01);
(Continued)

(58) Field of Classification Search
CPC . G01S 17/36; G09G 3/32; G06K 7/14; G06K 7/1443
(Continued)

(56) References Cited

U.S. PATENT DOCUMENTS 8,508,441 B2   8/2013  Kimura et al.
9,183,812 B2   11/2015 Myers et al.
(Continued)

FOREIGN PATENT DOCUMENTS

JP   2010-250171 A   11/2010
JP    2010250171 A   11/2010
(Continued)

OTHER PUBLICATIONS

International Search Report and Written Opinion for PCT Application No. PCT/US2017/047514 dated Oct. 30, 2017; 19 pgs.
(Continued)

*Primary Examiner* — Calvin C Ma
(74) *Attorney, Agent, or Firm* — Fletcher Yoder, P.C.

(57) ABSTRACT

A method for operating an electronic display includes receiving, using a controller, sensor data related to operational parameters of the electronic display based at least in part on illuminating a sense pixel of at least one row of pixels of the electronic display, wherein a first set of pixels below the at least one row of pixels renders a portion of a first image frame and a second set of pixels above the at least one row of pixels renders a portion of a second image frame. The method also includes adjusting, using the controller, image display on the electronic display based at least in part on the sensor data.

19 Claims, 15 Drawing Sheets

(51) Int. Cl.
*G01S 17/89* (2006.01)
*G06K 7/10* (2006.01)
*G06K 7/14* (2006.01)
*G06T 5/00* (2006.01)
*H04N 5/225* (2006.01)
*H04N 5/232* (2006.01)
*H04N 5/217* (2011.01)
*H04N 9/04* (2006.01)

(52) U.S. Cl.
CPC ..... *G06K 7/10732* (2013.01); *G06K 7/10752* (2013.01); *G06K 7/14* (2013.01); *G06K 7/1443* (2013.01); *G06T 5/008* (2013.01); *H04N 5/2253* (2013.01); *H04N 5/232* (2013.01); *G01S 7/4914* (2013.01); *H04N 5/217* (2013.01); *H04N 9/045* (2013.01); *H04N 2209/042* (2013.01)

(58) Field of Classification Search
USPC .................................................. 345/89, 174
See application file for complete search history.

(56) References Cited

U.S. PATENT DOCUMENTS

| | | | |
|---|---|---|---|
| 9,230,310 | B2 | 1/2016 | Black et al. |
| 9,438,867 | B2 | 9/2016 | Wang |
| 9,454,686 | B2 | 9/2016 | Wang |
| 9,514,682 | B2 | 12/2016 | Yang |
| 9,922,598 | B2 | 3/2018 | Park et al. |
| 10,134,106 | B2 | 11/2018 | Abarca et al. |
| 2010/0265228 | A1 | 10/2010 | Kimura et al. |
| 2016/0086541 | A1 | 3/2016 | Yang |
| 2016/0111044 | A1 | 4/2016 | Kishi et al. |
| 2016/0155377 | A1* | 6/2016 | Kishi ............... G09G 3/3233 345/214 |
| 2016/0187199 | A1* | 6/2016 | Brunk ............... G01J 3/2823 348/89 |
| 2016/0189618 | A1* | 6/2016 | Park ............... G09G 3/3233 345/690 |
| 2016/0198147 | A1 | 7/2016 | Waligorski et al. |

FOREIGN PATENT DOCUMENTS

| | | |
|---|---|---|
| KR | 10-2010-0047505 A | 5/2010 |
| KR | 10-2015-0047612 A | 5/2015 |
| KR | 10-2015-0114522 A | 10/2015 |
| KR | 10-2016-0034503 A | 3/2016 |
| KR | 10-2016-0078749 A | 7/2016 |
| WO | 2014/093020 A1 | 6/2014 |

OTHER PUBLICATIONS

Korean Search Report (WIPS) for Korean Application No. 10-2019-7005140 dated Mar. 11, 2019; 11 pgs.
Korean Notice of Allowance for Korean Application No. 9-5-2019-046317614dated Jun. 27, 2019; 2 pgs.
Notice of Preliminary Rejection for Korean Application No. 10-2019-7005149 dated Apr. 17, 2019; 8 pgs.

\* cited by examiner

SYSTEMS AND METHODS FOR IN-FRAME SENSING AND ADAPTIVE SENSING CONTROL

CROSS-REFERENCE TO RELATED APPLICATION

This application claims priority to and benefit from U.S. Provisional Application No. 62/394,595, filed Sep. 14, 2016, entitled "Systems and Methods for In-Frame Sensing and Adaptive Sensing Control," the contents of which is incorporated by reference in its entirety.

BACKGROUND

The present disclosure relates generally to electronic displays and, more particularly, sensing environmental operational parameters and/or display-related operational parameters of the electronic displays while operating electronic displays.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices often use one or more electronic displays to present visual representations of information as text, still images, and/or video by displaying one or more image frames. For example, such electronic devices may include computers, mobile phones, portable media devices, tablets, televisions, virtual-reality headsets, vehicle dashboards, and wearable devices, among many others. To accurately display an image frame, an electronic display may control light emission (e.g., actual luminance) from its display pixels, for example, based on environmental operational parameters (e.g., ambient temperature, humidity, brightness, and the like) and/or display-related operational parameters (e.g., light emission, current signal magnitude which may affect light emission, and the like). However, in certain circumstances (e.g., in a dark environment), sensing while displaying an image frame may result in undesired light emission, which, when perceivable, may affect perceived image quality.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to sensing environmental operational parameters and/or display-related operational parameters while an electronic display is operating to display an image frame. Generally, an electronic display may display an image frame by refreshing (e.g., updating) display pixels with image data corresponding to the image frame. Thus, when refreshing a display pixel, the display pixel may be non-light emitting. To refresh each of the display pixels, an electronic display may propagate a refresh pixel group through (e.g., down) the display pixels. For example, a refresh pixel group may be propagated to a first group of display pixel rows, thereby refreshing image data written to the display pixels in the first group of display pixel rows. Subsequently, the refresh pixel group may be propagated to a second group of display pixel rows, thereby refreshing image data written to the display pixels in the second group of display pixel rows.

In some embodiments, sensing operations may be performed by illuminating one or more display pixels (e.g., sense pixels). Since display pixels may be non-light emitting when refreshing, a sensing operation may be performed by illuminating one or more sense pixels in a refresh pixel group to facilitate sensing (e.g., determining) environmental operational parameters and/or display-related operational parameters. For example, the electronic display may illuminate one or more sense pixels in the second group of display pixel rows when the refresh pixel group is propagated to the second group of display pixel rows to perform a sensing operation. In this manner, the electronic display may perform sensing operations while displaying an image frame (e.g., during normal operation).

In some embodiments, to increase refresh rate, an electronic display may simultaneously propagate multiple (e.g., non-contiguous) refresh pixel groups through its display pixels. For example, a first refresh pixel group may be propagated through the first group of display pixel rows, the second group of display pixel rows, and so on. Simultaneously, a second refresh pixel group may be propagated through a third group of display pixel rows, a fourth group of display pixel rows, and so on. In some embodiments, when multiple refresh pixel groups are used, the electronic display may illuminate one or more sense pixels to perform sensing operations similar to when one refresh pixel group is used.

To reduce timing complexity, in other embodiments, the electronic display may pause propagation of the refresh pixel groups during a sensing operation. For example, an electronic display may pause propagation of the first refresh pixel group and the second refresh pixel group when one or more sense pixels in the first refresh pixel group are illuminated during a sensing operation. However, pausing propagation of the refresh pixel group may cause variation between light emission duration and, thus, perceived luminance between different display pixels.

To reduce perceivability of luminance variations, in some embodiments, an electronic display may continue propagation of the refresh pixel groups during a sensing operation. For example, when one or more sense pixels in the first refresh pixel group are illuminated during the sensing operation, the electronic display may continue propagating the second refresh pixel group. Additionally, the electronic display may continue toggling display pixels in the first refresh pixel group that are not being used to perform the sensing operation. In this manner, the electronic display may perform sensing operations while displaying an image frame (e.g., during normal operation) using multiple refresh pixel groups.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "one embodiment," "an embodiment," "embodiments," and "some embodiments" of the present disclosure are not intended to be interpreted as excluding the existence of additional embodiments that also incorporate the recited features.

Figure 1:
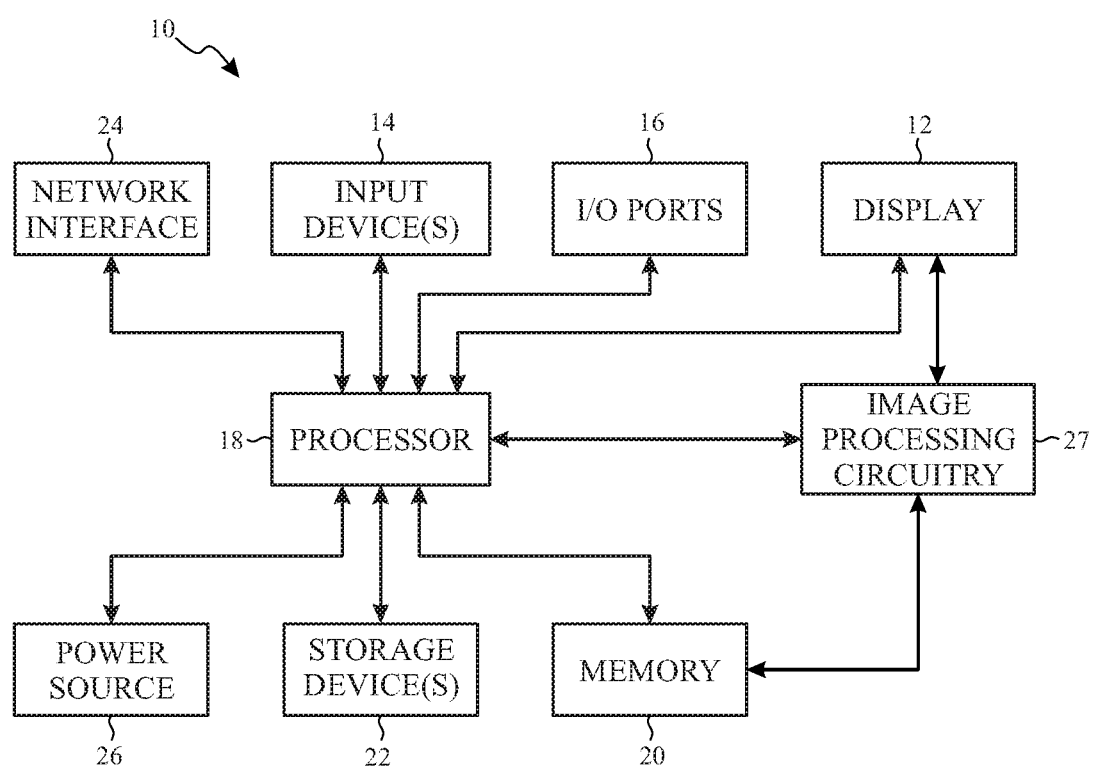
FIG. 1 is a block diagram of an electronic device used to display image frames, in accordance with an embodiment of the present disclosure.

To accurately display an image frame, an electronic display may control light emission (e.g., actual luminance) from its display pixels, based on for example, environmental operational parameters (e.g., ambient temperature, humidity, brightness, and the like) and/or display-related operational parameters (e.g., light emission, current signal magnitude which may affect light emission, and the like). To help illustrate, an electronic device 10 including an electronic display 12 is shown in FIG. 1. As will be described in more detail below, the electronic device 10 may be any suitable electronic device, such as a computer, a mobile phone, a portable media device, a tablet, a television, a virtual-reality headset, a vehicle dashboard, and the like. Thus, it should be noted that FIG. 1 is merely one example of a particular implementation and is intended to illustrate the types of components that may be present in the electronic device 10.

In the depicted embodiment, the electronic device 10 includes the electronic display 12, one or more input devices 14, one or more input/output (I/O) ports 16, a processor core complex 18 having one or more processor(s) or processor cores, local memory 20, a main memory storage device 22, a network interface 24, a power source 26, and image processing circuitry 27. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the local memory 20 and the main memory storage device 22 may be included in a single component. Additionally, the image processing circuitry 27 (e.g., a graphics processing unit) may be included in the processor core complex 18.

As depicted, the processor core complex 18 is operably coupled with local memory 20 and the main memory storage device 22. Thus, the processor core complex 18 may execute instruction stored in local memory 20 and/or the main memory storage device 22 to perform operations, such as generating and/or transmitting image data. As such, the processor core complex 18 may include one or more general purpose microprocessors, one or more application specific processors (ASICs), one or more field programmable logic arrays (FPGAs), or any combination thereof.

In addition to executable instructions, the local memory 20 and/or the main memory storage device 22 may store data to be processed by the processor core complex 18. Thus, in some embodiments, the local memory 20 and/or the main storage device 22 may include one or more tangible, non-transitory, computer-readable mediums. For example, the local memory 20 may include random access memory (RAM) and the main memory storage device 22 may include read only memory (ROM), rewritable non-volatile memory such as flash memory, hard drives, optical discs, and the like.

As depicted, the processor core complex 18 is also operably coupled with the network interface 24. In some embodiments, the network interface 24 may facilitate communicating data with another electronic device and/or a network. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, and/or a wide area network (WAN), such as a 4G or LTE cellular network.

Additionally, as depicted, the processor core complex 18 is operably coupled to the power source 26. In some embodiments, the power source 26 may provide electrical power to one or more component in the electronic device 10, such as the processor core complex 18 and/or the electronic display 12. Thus, the power source 26 may include any suitable source of energy, such as a rechargeable lithium polymer (Li-poly) battery and/or an alternating current (AC) power converter.

Furthermore, as depicted, the processor core complex 18 is operably coupled with the I/O ports 16. In some embodiments, the I/O ports 16 may enable the electronic device 10 to interface with other electronic devices. For example, a portable storage device may be connected to an I/O port 16, thereby enabling the processor core complex 18 to communicate data with the portable storage device.

As depicted, the electronic device 10 is also operably coupled with input devices 14. In some embodiments, the input device 14 may facilitate user interaction with the electronic device 10, for example, by receiving user inputs. Thus, the input devices 14 may include a button, a keyboard, a mouse, a trackpad, and/or the like. Additionally, in some embodiments, the input devices 14 may include touch-sensing components in the electronic display 12. In such embodiments, the touch sensing components may receive user inputs by detecting occurrence and/or position of an object touching the surface of the electronic display 12.

In addition to enabling user inputs, the electronic display 12 may include a display panel with one or more display pixels. As described above, the electronic display 12 may control light emission from the display pixels to present visual representations of information, such as a graphical user interface (GUI) of an operating system, an application interface, a still image, or video content, by display image frames based at least in part on corresponding image data. In some embodiments, the electronic display 12 may be a display using light-emitting diodes (LED display), a self-emissive display, such as an organic light-emitting diode (OLED) display, or the like. Additionally, in some embodiments, the electronic display 12 may refresh display of an image and/or an image frame, for example, at 60 Hz (corresponding to refreshing 60 frames per second), 120 Hz (corresponding to refreshing 120 frames per second), and/or 240 Hz (corresponding to refreshing 240 frames per second).

As depicted, the electronic display 12 is operably coupled to the processor core complex 18 and the image processing circuitry 27. In this manner, the electronic display 12 may display image frames based at least in part on image data generated by the processor core complex 18 and/or the image processing circuitry 27. Additionally or alternatively, the electronic display 12 may display image frames based at least in part on image data received via the network interface 24 and/or the I/O ports 16.

Figure 2:
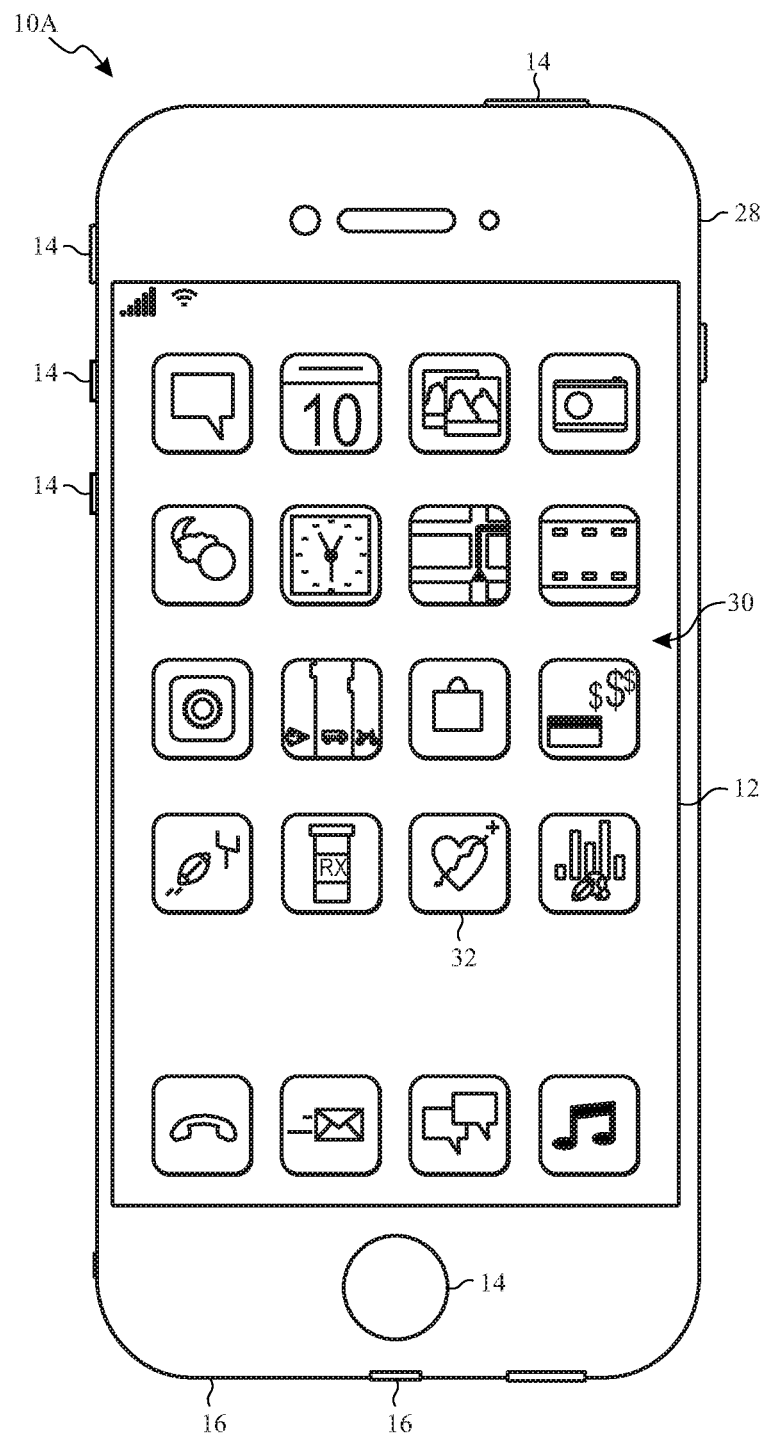
FIG. 2 is one example of the electronic device of FIG. 1, in accordance with an embodiment of the present disclosure.

As described above, the electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For example, the handheld device 10A may be a smart phone, such as any iPhone® model available from Apple Inc.

As depicted, the handheld device 10A includes an enclosure 28 (e.g., housing). In some embodiments, the enclosure 28 may protect interior components from physical damage and/or shield them from electromagnetic interference. Additionally, as depicted, the enclosure 28 surrounds the electronic display 12. In the depicted embodiment, the electronic display 12 is displaying a graphical user interface (GUI) 30 having an array of icons 32. By way of example, when an icon 32 is selected either by an input device 14 or a touch-sensing component of the electronic display 12, an application program may launch.

Furthermore, as depicted, input devices 14 extend through the enclosure 28. As described above, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. As depicted, the I/O ports 16 also open through the enclosure 28. In some embodiments, the I/O ports 16 may include, for example, an audio jack to connect to external devices.

Figure 3:
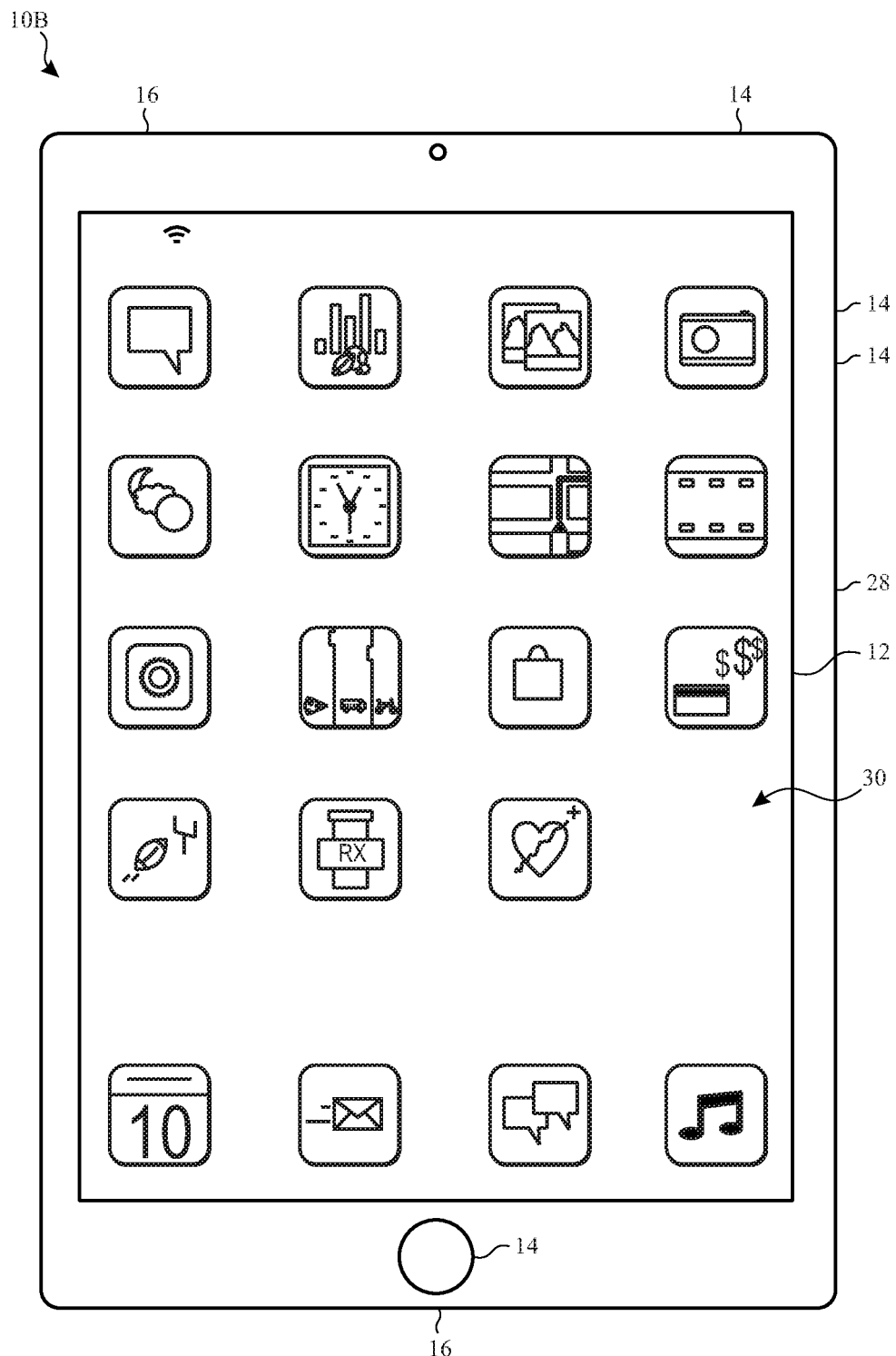
FIG. 3 is another example of the electronic device of FIG. 1, in accordance with an embodiment of the present disclosure.
Figure 4:
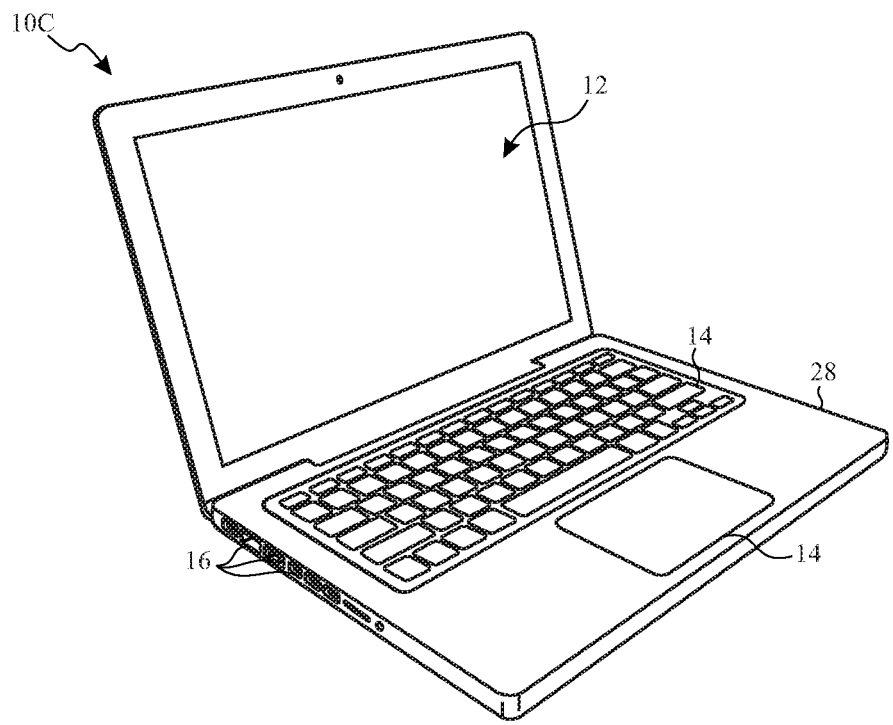
FIG. 4 is another example of the electronic device of FIG. 1, in accordance with an embodiment of the present disclosure.
Figure 5:
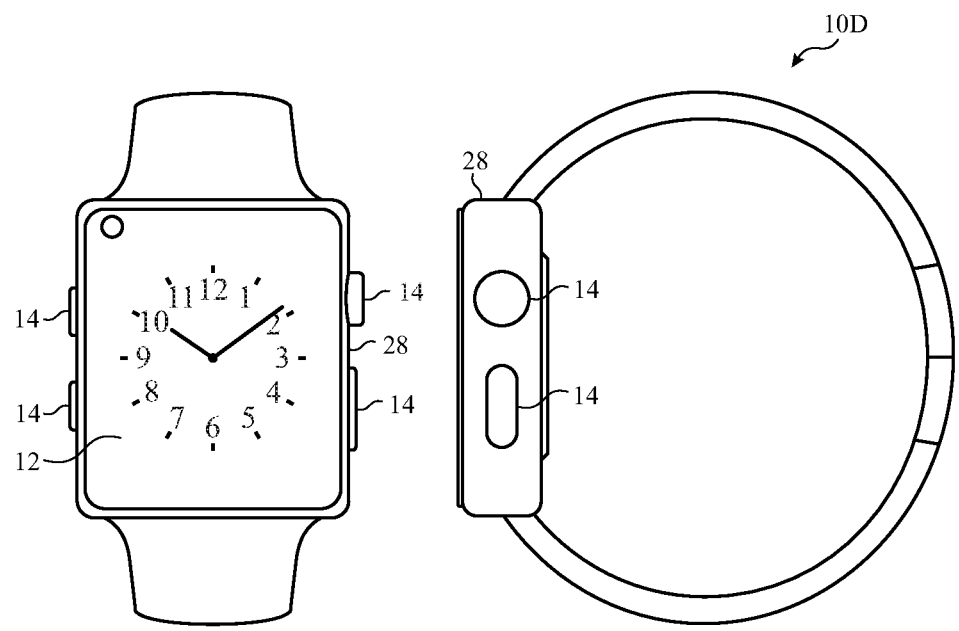
FIG. 5 is another example of the electronic device of FIG. 1, in accordance with an embodiment of the present disclosure.

To further illustrate an example of a suitable electronic device 10, specifically a tablet device 10B, is shown in FIG. 3. For illustrative purposes, the tablet device 10B may be any iPad® model available from Apple Inc. A further example of a suitable electronic device 10, specifically a computer 10C, is shown in FIG. 4. For illustrative purposes, the computer 10C may be any Macbook® or iMac® model available from Apple Inc. Another example of a suitable electronic device 10, specifically a watch 10D, is shown in FIG. 5. For illustrative purposes, the watch 10D may be any Apple Watch® model available from Apple Inc. As depicted, the tablet device 10B, the computer 10C, and the watch 10D each also includes an electronic display 12, input devices 14, and an enclosure 28.

As described above, the electronic display 12 may display image frames based at least in part on received image data, for example, from the processor core complex 18 and/or the image processing circuitry 27. Additionally, based on the image data, the electronic display 12 may write image frames by supplying analog electrical signals to the display pixels to control light emission from the display pixels. To facilitate improving perceived image quality, in some embodiments, a display pipeline may process the image data before being used to display image frames.

Figure 6:
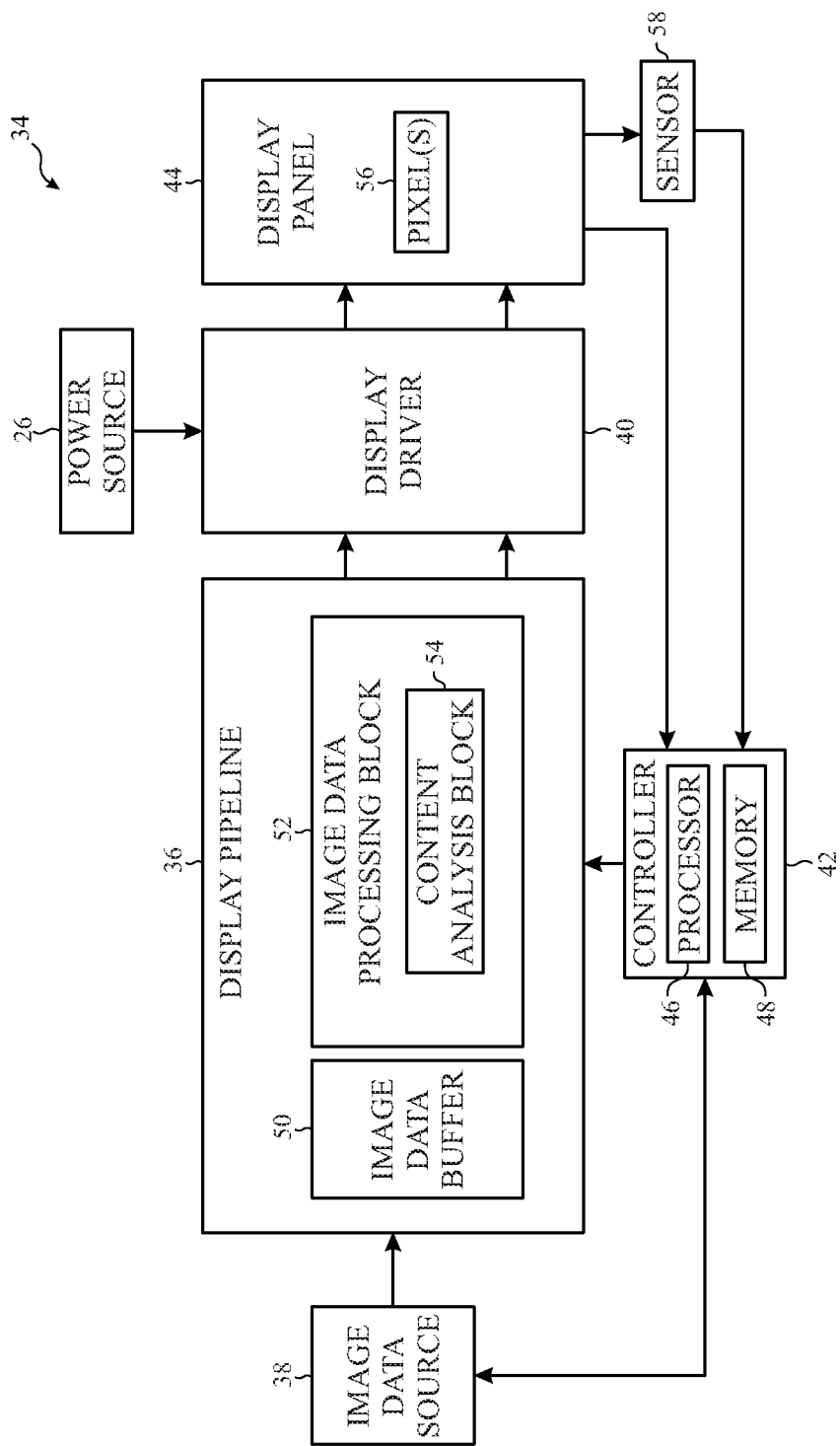
FIG. 6 is block diagram of a portion of the electronic device of FIG. 1 used to display image frames, in accordance with an embodiment.

To help illustrate, a portion 34 of the electronic device 10 including a display pipeline 36 is shown in FIG. 6. In some embodiments, the display pipeline 36 may be implemented by circuitry in the electronic device 10, circuitry in the electronic display 12, or a combination thereof. For example, the display pipeline 36 may be included in the processor core complex 18, the image processing circuitry 27, a timing controller (TCON) in the electronic display 12, or any combination thereof.

As depicted, the portion 34 of the electronic device 10 also includes the power source 26, an image data source 38, a display driver 40, a controller 42, and a display panel 44. In some embodiments, the controller 42 may control operation of the display pipeline 36, the image data source 38, and/or the display driver 40. To control operation, the controller 42 may include a controller processor 46 and controller memory 48. In some embodiments, the controller processor 46 may execute instructions stored in the controller memory 48. Thus, in some embodiments, the controller processor 46 may be included in the processor core complex 18, the image processing circuitry 27, a timing controller in the electronic display 12, a separate processing module, or any combination thereof. Additionally, in some embodiments, the controller memory 48 may be included in the local memory 20, the main memory storage device 22, a separate tangible, non-transitory, computer readable medium, or any combination thereof.

In the depicted embodiment, the display pipeline 36 is communicatively coupled to the image data source 38. In this manner, the display pipeline 36 may receive image data from the image data source 38. As described above, in some embodiments, the image data source 38 may be included in the processor core complex 18, the image processing circuitry 27, or a combination thereof. In other words, the image data source 38 may provide image data to be displayed by the display panel 44.

Additionally, in the depicted embodiment, the display pipeline 36 includes an image data buffer 50 to store image data, for example, received from the image data source 38. In some embodiments, the image data buffer 50 may store image data to be processed by and/or already processed by the display pipeline 36. For example, the image data buffer 50 may store image data corresponding with multiple image frames (e.g., a previous image frame, a current image frame, and/or a subsequent image frame). Additionally, the image data buffer may store image data corresponding with multiple portions (e.g., a previous row, a current row, and/or a subsequent row) of an image frame.

To process the image data, the display pipeline 36 may include one or more image data processing blocks 52. For example, in the depicted embodiment, the image data processing blocks 52 include a content analysis block 54. Additionally, in some embodiments, the image data processing block 52 may include an ambient adaptive pixel (AAP) block, a dynamic pixel backlight (DPB) block, a white point correction (WPC) block, a sub-pixel layout compensation (SPLC) block, a burn-in compensation (BIC) block, a panel response correction (PRC) block, a dithering block, a sub-pixel uniformity compensation (SPUC) block, a content frame dependent duration (CDFD) block, an ambient light sensing (ALS) block, or any combination thereof.

To display an image frame, the content analysis block 54 may process the corresponding image data to determine content of the image frame. For example, the content analysis block 54 may process the image data to determine target luminance (e.g., greyscale level) of display pixels 56 for displaying the image frame. Additionally, the content analysis block 54 may determine control signals, which instruct the display driver 40 to generate and supply analog electrical signals to the display panel 44. To generate the analog electrical signals, the display driver 40 may receive electrical power from the power source 26, for example, via one or more power supply rails. In particular, the display driver 40 may control supply of electrical power from the one or more power supply rails to display pixels 56 in the display panel 44.

In some embodiments, the content analysis block 54 may determine pixel control signals that each indicates a target pixel current to be supplied to a display pixel 56 in the display panel 44 of the electronic display 12. Based at least in part on the pixel control signals, the display driver 40 may illuminate display pixels 56 by generating and supplying analog electrical signals (e.g., voltage or current) to control light emission from the display pixels 56. In some embodiments, the content analysis block 54 may determine the pixel control signals based at least in part on target luminance of corresponding display pixels 56.

Additionally, in some embodiments, one or more sensors 58 may be used to sense (e.g., determine) information related to display performance of the electronic device 10 and/or the electronic display 12, such as display-related operational parameters and/or environmental operational parameters. For example, the display-related operational parameters may include actual light emission from a display pixel 56 and/or current flowing through the display pixel 56. Additionally, the environmental operational parameters may include ambient temperature, humidity, and/or ambient light.

In some embodiments, the controller 42 may determine the operational parameters based at least in part on sensor data received from the sensors 58. Thus, as depicted, the sensors 58 are communicatively coupled to the controller 42. In some embodiments, the controller 42 may include a sensing controller that controls performance of sensing operations and/or determines results (e.g., operational parameters and/or environmental parameters) of the sensing operations.

Figure 7:
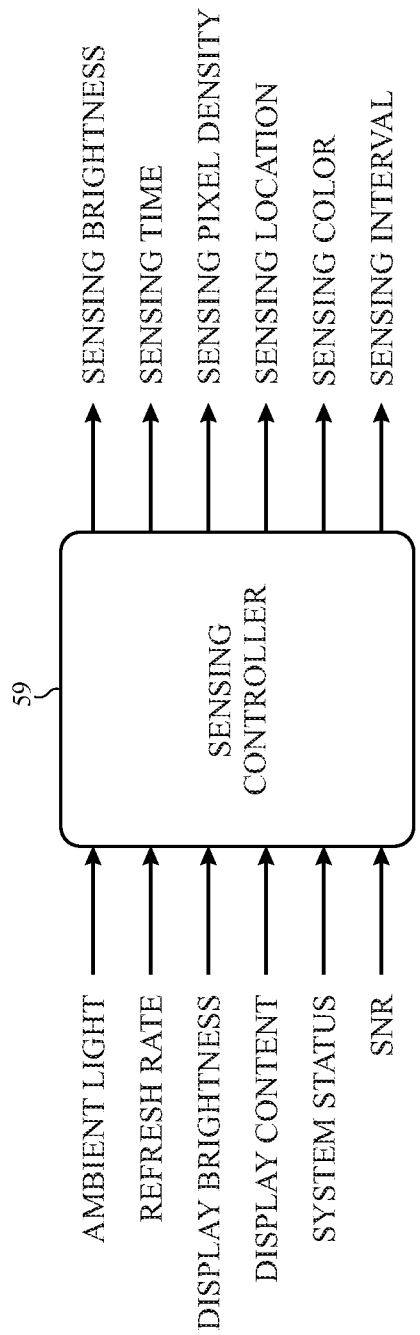
FIG. 7 is a block diagram of a sensing controller, in accordance with an embodiment of the present disclosure.

To help illustrate, one embodiment of a sensing controller 59 that may be included in the controller 42 is shown in FIG. 7. In some embodiments, the sensing controller 59 may receive sensor data from the one or more sensors 58 and/or operational parameter data of the electronic display 12, for example, from the controller 42. In the depicted embodiment, the sensing controller 59 receives data indicating ambient light, refresh rate, display brightness, display content, system status, and/or signal to noise ratio (SNR).

Additionally, in some embodiments, the sensing controller 59 may process the received data to determine control commands instructing the display pipeline 36 to perform control actions and/or determine control commands instructing the electronic display to perform control actions. In the depicted embodiment, the sensing controller 59 outputs control commands indicating sensing brightness, sensing time (e.g., duration), sense pixel density, sensing location, sensing color, and sensing interval. It should be understood that the described input data and output control commands are merely intended to be illustrative and not limiting.

As described above, the electronic display 12 may refresh an image or an image frame at a refresh rate, such as 60 Hz, 120 Hz, and/or 240 Hz. To refresh an image frame, the display driver 40 may refresh (e.g., update) image data written to the display pixels 56 on the display panel 44. For example, to refresh a display pixel 56, the electronic display 12 may toggle the display pixel 56 from a light emitting mode to a non-light emitting mode and write image data to the display pixel 56 such that display pixel 56 emits light based on the image data when toggled back to the light emitting mode. Additionally, in some embodiments, display pixels 56 may be refreshed with image data corresponding to an image frame in one or more contiguous refresh pixel groups.

Figure 8:
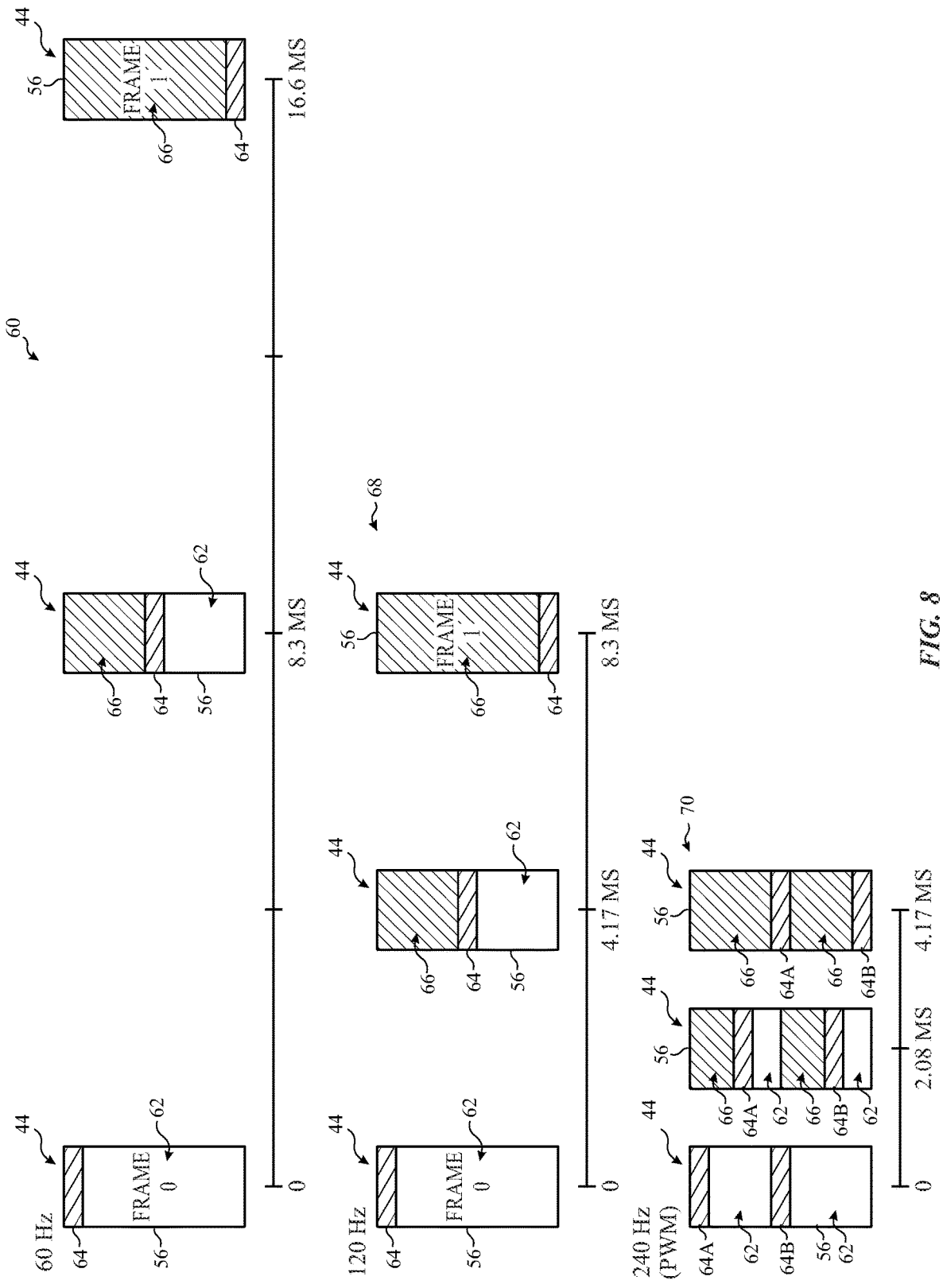
FIG. 8 is a diagram of a display panel refreshing display of one or more image frames, in accordance with an embodiment of the present disclosure.

To help illustrate, timing diagrams of a display panel 44 using different refresh rates to display an image frame are shown in FIG. 8. In particular, a first timing diagram 60 describes the display panel 44 operating using a 60 Hz refresh rate, a second timing diagram 68 describes the display panel 44 operating using a 120 Hz refresh rate, and a third timing diagram 70 describes the display panel 44 operating using a 240 Hz pulse-width modulated (PWM) refresh rate. Generally, the display panel 44 includes multiple display pixel rows. To refresh the display pixels 56, the one or more refresh pixel groups 64 may be propagated down the display panel 44. In some embodiments, display pixels 56 in a refresh pixel group 64 may be toggled to a non-light emitting mode. Thus, with regard to the depicted embodiment, a refresh pixel groups 64 is depicted as a solid black stripe.

With regard to the first timing diagram 60, a new image frame is displayed by the display panel 44 approximately once every 16.6 milliseconds when using the 60 Hz refresh rate. In particular, at 0 ms, the refresh pixel group 64 is positioned at the top of the display panel 44 and the display pixels 56 below the refresh pixel group 64 illuminate based on image data corresponding with a previous image frame 62. At approximately 8.3 ms, the refresh pixel group 64 has rolled down to approximately halfway between the top and the bottom of the display panel 44. Thus, the display pixels 56 above the refresh pixel group 64 may illuminate based on image data corresponding to a next image frame 66 while the display pixels 56 below the refresh pixel group 64 illuminate based on image data corresponding with the previous image frame 62. At approximately 16.6 ms, the refresh pixel group 64 has rolled down to the bottom of the display panel 44 and, thus, each of the display pixels 56 above the refresh pixel group 64 may illuminate based on image data corresponding to the next image frame 66.

With regard to the second timing diagram 68, a new frame is displayed by the display panel 44 approximately once every 8.3 milliseconds when using the 120 Hz refresh rate. In particular, at 0 ms, the refresh pixel group 64 is positioned at the top of the display panel 44 and the display pixels 56 below the refresh pixel group 64 illuminate based on image data corresponding with a previous image frame 62. At approximately 4.17 ms, the refresh pixel group 64 has rolled down to approximately halfway between the top and the bottom of the display panel 44. Thus, the display pixels 56 above the refresh pixel group 64 may illuminate based on image data corresponding to a next image frame 66 while the display pixels 56 below the refresh pixel group 64 illuminate based on image data corresponding with the previous image frame 62. At approximately 8.3 ms, the refresh pixel group 64 has rolled down to the bottom of the display panel 44 and, thus, each of the display pixels 56 above the refresh pixel group 64 may illuminate based on image data corresponding to the next image frame 66.

With regard to the third timing diagram 70, a new frame is displayed by the display panel 44 approximately once every 4.17 milliseconds when using the 240 Hz PWM refresh rate by using multiple noncontiguous refresh pixel groups—namely a first refresh pixel group 64A and a second refresh pixel group 64B. In particular, at 0 ms, the first refresh pixel group 64A is positioned at the top of the display panel 44 and a second refresh pixel group 64B is positioned approximately halfway between the top and the bottom of the display panel 44. Thus, the display pixels 56 between the first refresh pixel group 64A and the second refresh pixel group 64B may illuminate based on image data corresponding to a previous image frame 62, and the display pixels 56 between the first refresh pixel group 64A and the second refresh pixel group 64B may illuminate based on image data corresponding to the previous image frame 62.

At approximately 2.08 ms, the first refresh pixel group 64A has rolled down to approximately one quarter of the way between the top and the bottom of the display panel 44 and the second refresh pixel group 64B has rolled down to approximately three quarters of the way between the top and the bottom of the display panel 44. Thus, the display pixels 56 above the first pixel refresh group 64 illuminate based on image data corresponding to a next image frame 66 and the display pixels 56 between the position of the second refresh pixel group 64B at 0 ms and the second refresh pixel group 64B illuminate based on image data corresponding to the next image frame 66. At approximately 4.17 ms, the first refresh pixel group 64A has rolled approximately halfway down between the top and the bottom of the display panel 44 and the second refresh pixel group 64B has rolled to the bottom of the display panel 44. Thus, the display pixel 56 above the first refresh pixel group 64A and the display pixels between the first refresh pixel group 64A and the second refresh pixel group 64B may illuminate based on image data corresponding to the next image frame 66.

As described above, refresh pixel groups 64 (including 64A and 64B) may be used to sense information related to display performance of the display panel 44, such as environmental operational parameters and/or display-related operational parameters. That is, the sensing controller 59 may instruct the display panel 44 to illuminate one or more display pixels 56 (e.g., sense pixels) in a refresh pixel group 64 to facilitate sensing the relevant information. In some embodiments, a sensing operation may be performed at any suitable frequency, such as once per image frame, once every 2 image frames, once every 5 image frames, once every 10 image frames, between image frames, and the like. Additionally, in some embodiments, a sensing operation may be performed for any suitable duration of time, such as between 20 µs and 500 µs (e.g., 50 µs, 75 µs, 100 µs, 125 µs, 150 µs, and the like).

As discussed above, a sensing operation may be performed by using one or more sensors 58 to determine sensor data indicative of operational parameters. Additionally, the controller 42 may process the sensor data to determine the operational parameters. Based at least in part on the operational parameters, the controller 42 may instruct the display pipeline 36 and/or the display driver 40 to adjust image data written to the display pixels 56, for example, to compensate for expected affects the operational parameters may have on perceived luminance.

Additionally, as described above, sense pixels may be illuminated during a sensing operation. Thus, when perceivable, illuminated sense pixels may result in undesired front of screen (FOS) artifacts. To reduce the likelihood of producing front of screen artifacts, characteristics of the sense pixels may be adjusted based on various factors expected to affect perceivability, such as content of an image frame and/or ambient light conditions.

Figure 9:
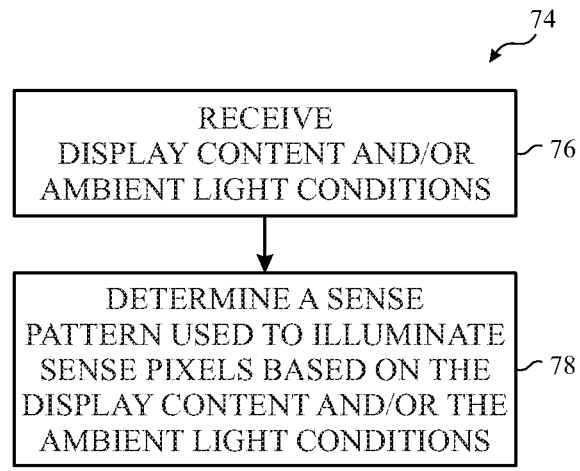
FIG. 9 is a flow diagram of a process for determining a pattern of illuminated sense pixels, in accordance with an embodiment of the present disclosure.

To help illustrate, one embodiment of a process 74 for adjusting a characteristics—namely a pattern—of the sense pixels is described in FIG. 9. Generally, the process 74 includes receiving display content and/or ambient light conditions (process block 76) and determining a sense pattern used to illuminate the sense pixels based on the display content and/or the ambient light conditions (process block 78). In some embodiments, the process 74 may be implemented by executing instructions stored in a tangible, non-transitory, computer-readable medium, such as the controller memory 48, using a processor, such as the controller processor 46.

Accordingly, in some embodiments, the controller 42 may receive display content and/or ambient light conditions (process block 76). For example, the controller 42 may receive content of an image frame from the content analysis block 54. In some embodiments, the display content may include information related to color, variety of patterns, amount of contrast, change of image data corresponding to an image frame compared to image data corresponding to a previous frame, and/or the like. Additionally, the controller 42 may receive ambient light conditions from one or more sensors 58 (e.g., an ambient light sensor). In some embodiments, the ambient light conditions may include information related to the brightness/darkness of the ambient light.

Based at least in part on the display content and/or ambient light conditions, the controller 42 may determine a sense pattern used to illuminate the sense pixels (process block 78). In this manner, the controller 42 may determine the sense pattern to reduce likelihood of illuminating the sense pixels cause a perceivable visual artifact. For example, when the content to be displayed includes solid, darker blocks, less variety of colors or patterns, and the like, the controller 42 may determine that a brighter, more solid pattern of sense pixels should not be used. On the other hand, when the content being displayed includes a large variety of different patterns and colors that change frequently from frame to frame, the controller 42 may determine that a brighter, more solid pattern of sense pixels may be used. Similarly, when there is little ambient light, the controller 42 may determine that a brighter, more solid pattern of sense pixels should not be used. On the other hand, when there is greater ambient light, the controller 42 may determine that a brighter, more solid pattern of sense pixels may be used.

Figure 10:
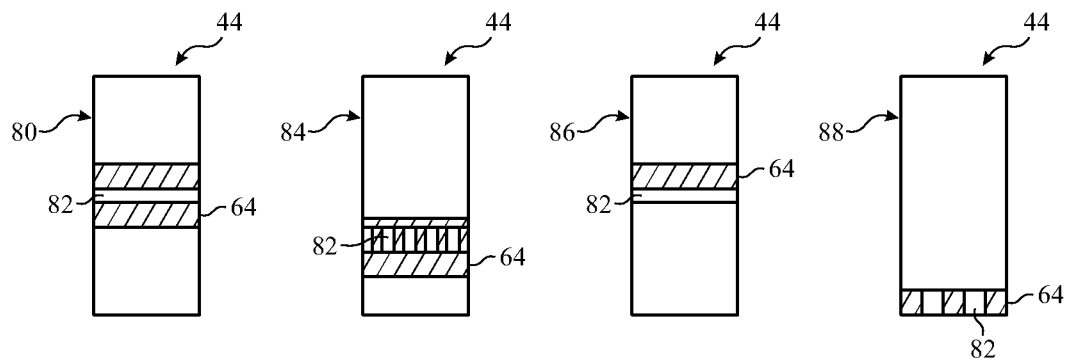
FIG. 10 is a diagram of example patterns of sense pixels, in accordance with an embodiment of the present disclosure.

To help illustrate, examples of sense patterns that may be used to sense information related to display performance of the display panel 44 are depicted in FIG. 10. In particular, FIG. 10 describes a first sense pattern 80, a second sense pattern 84, a third sense pattern 86, and a fourth sense pattern 88 displayed using sense pixels 82 in a refresh pixel group 64. As depicted, the sense patterns have varying characteristics, such as density, color, location, configuration, and/or dimension.

For example, with regard to the first sense pattern 80, one or more contiguous sense pixel rows in the refresh pixel group 64 are illuminated. Similarly, one or more contiguous sense pixel rows in the refresh pixel group 64 are illuminated in the third sense pattern 86. However, compared to the first sense pattern 80, the sense pixels 82 in the third sense pattern 86 may be a different color, a location on the display panel 44, and/or include fewer rows.

To reduce perceivability, noncontiguous sense pixels 82 may be illuminated, as shown in the second sense pattern 84. Similarly, noncontiguous sense pixels 82 are illuminated in the fourth sense pattern 88. However, compared to the second sense pattern 84, the sense pixels 82 in the fourth sense pattern 88 may be a different color, a location on the display panel 44, and/or include fewer rows. In this manner, the characteristics (e.g., density, color, location, configuration, and/or dimension) of sense patterns may be dynamically adjusted based at least in part on content of an image frame and/or ambient light to reduce perceivability of illuminated sense pixels 82. It should be understood that the sensing patterns described are merely intended to be illustrative and not limiting. In other words, in other embodiments, other sense pattern with varying characteristics may be implements, for example, based on operational parameter to be sensed.

Figure 11:
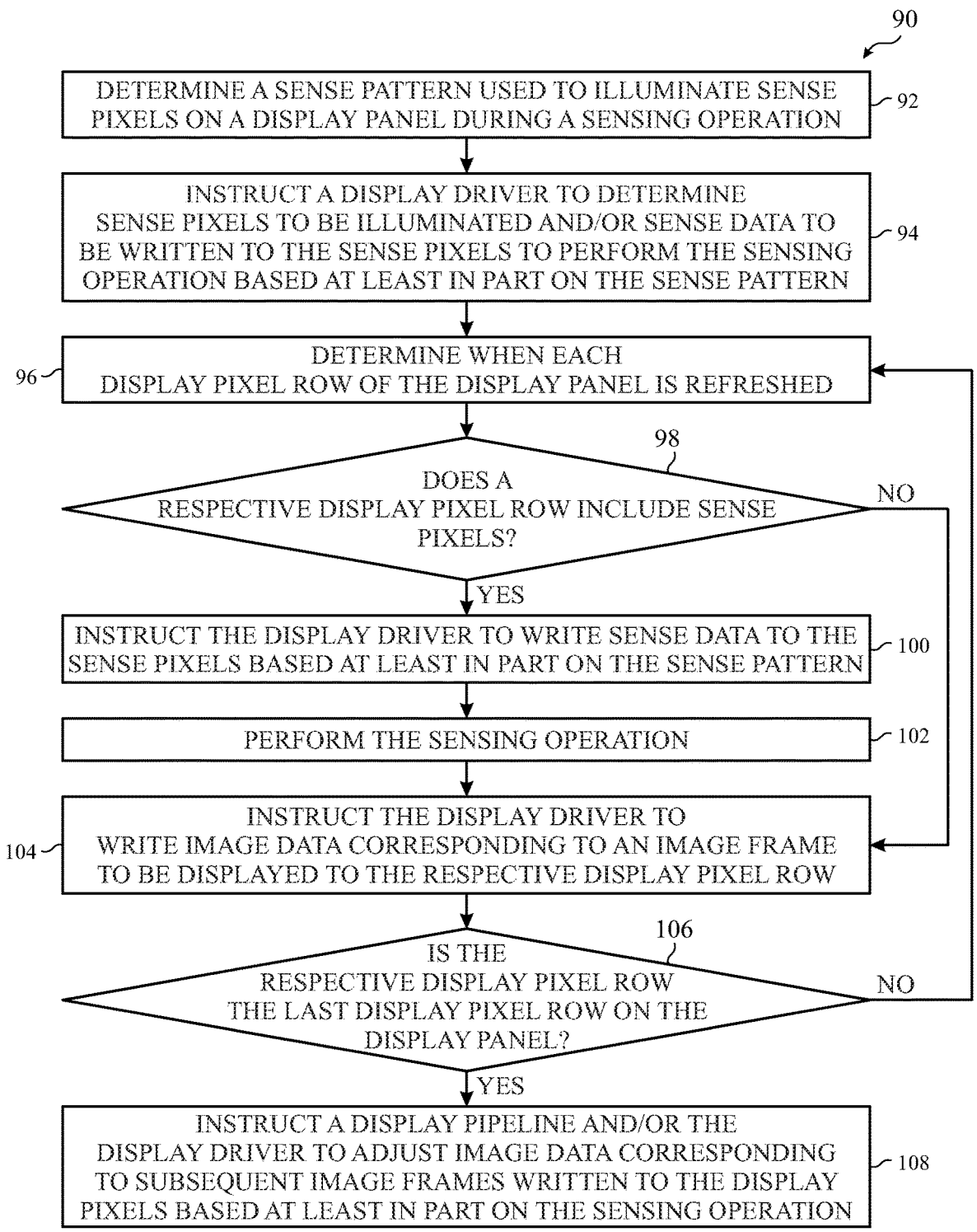
FIG. 11 is a flow diagram of a process for sensing operational parameters using sense pixels in a refresh pixel group while an image frame is displayed, in accordance with an embodiment of the present disclosure.

One embodiment of a process 90 for sensing operational parameters using sense pixels 82 in a refresh pixel group 64 is described in FIG. 11. Generally, the process 90 includes determining a sense pattern used to illuminate sense pixels 82 during a sensing operation (process block 92), instructing the display driver 40 to determine sense pixels 82 to be illuminated and/or sense data to be written to the sense pixels 82 to perform the sensing operation (process block 94), determining when each display pixel row of the display panel 44 is to be refreshed (process block 96), determining whether a row includes sense pixels 82 (decision block 98), instructing the display driver 40 to write sense data to the sense pixels 82 based at least in part on the sense pattern when the row includes sense pixels 82 (process block 100), performing a sensing operation (process block 102), instructing the display driver 40 to write image data corresponding to an image frame to be displayed to each of the display pixels 56 in the row when the row does not include sense pixels 82 and/or after the sensing operation is performed (process block 104), determining whether the row is the last pixel row on the display panel 44 (decision block 106), and instructing the display pipeline 36 and/or the display driver 40 to adjust image data corresponding to subsequent image frames written to the display pixels 56 based at least in part on the sensing operation (e.g., determined operational parameters) (process block 108). While the process 90 is described using steps in a specific sequence, it should be understood that the present disclosure contemplates that the describe steps may be performed in different sequences than the sequence illustrated, and certain described steps may be skipped or not performed altogether. In some embodiments, the process 90 may be implemented by executing instructions stored in a tangible, non-transitory, computer-readable medium, such as the controller memory 48, using a processor, such as the controller processor 46.

Accordingly, in some embodiments, the controller 42 may determine a sense pattern used to illuminate sense pixels 82 during a sensing operation (process block 92). As described above, the controller 42 may determine a sense pattern based at least in part on content of an image frame to be displayed and/or ambient light conditions to facilitate reducing likelihood of the sensing operation causing perceivable visual artifacts. Additionally, in some embodiments, the sense patterns with varying characteristics may be predetermined and stored, for example, in the controller memory 48. Thus, in such embodiments, controller 42 may determine the sense pattern by selecting and retrieving a sense pattern. In other embodiments, the controller 42 may determine the sense pattern by dynamically adjusting a default sensing pattern.

Based at least in part on the sense pattern, the controller 42 may instruct the display driver 40 to determine sense pixels 82 to be illuminated and/or sense data to be written to the sense pixels 82 to perform the sensing operation (process block 94). In some embodiments, the sensing pattern may indicate characteristics of sense pixels 82 to be illuminated during the sensing operation. As such, the controller 42 may analyze the sensing pattern to determine characteristics such as, density, color, location, configuration, and/or dimension of the sense pixels 82 to be illuminated.

Additionally, the controller 42 may determine when each display pixel row of the display panel 44 is to be refreshed (process block 96). As described above, display pixels 56 may be refreshed (e.g., updated) with image data corresponding with an image frame by propagating a refresh pixel group 64. Thus, when a row is to be refreshed, the controller 42 may determine whether the row includes sense pixels 82 (decision block 98).

When the row includes sense pixels 82, the controller 42 may instruct the display driver 40 to write sense data to the sense pixels 82 based at least in part on the sense pattern. (process block 100). The controller 42 may then perform a sensing operation (process block 102). In some embodiments, to perform the sensing operation, the controller 42 may instruct the display driver 40 to write sensing image data to the sense pixels 82. Additionally, the controller 42 may instruct the display panel 44 to illuminate the sense pixels 82 based on the sensing image data, thereby enabling one or more sensors 58 to determine (e.g., measure) sensor data resulting from illumination of the sense pixels 82.

In this manner, the controller 42 may receive and analyze sensor data received from one or more sensors 58 indicative of environmental operational parameters and/or display-related operational parameters. As described above, in some embodiments, the environmental operational parameters may include ambient temperature, humidity, brightness, and the like. Additionally, in some embodiments, the display-related operational parameters may include an amount of light emission from at least one display pixel 56 of the display panel 44, an amount of current at the at least one display pixel 56, and the like.

When the row does not include sense pixels 82 and/or after the sensing operation is performed, the controller 42 may instruct the display driver 40 to write image data corresponding to an image frame to be displayed to each of the display pixels 56 in the row (process block 104). In this manner, the display pixels 56 may display the image frame when toggled back into the light emitting mode.

Additionally, the controller 42 may determine whether the row is the last display pixel row on the display panel 44 (decision block 106). When not the last row, the controller 42 may continue propagating the refresh pixel group 64 successively through rows of the display panel 44 (process block 96). In this manner, the display pixels 56 may be refreshed (e.g., update) to display the image frame.

On the other hand, when the last row is reached, the controller 42 may instruct the display pipeline 36 and/or the display driver 40 to adjust image data corresponding to subsequent image frames written to the display pixels 56 based at least in part on the sensing operation (e.g., determined operational parameters) (process block 108). In some embodiments, the controller 42 may instruct the display pipeline 36 and/or the display driver 40 to adjust image data to compensate for determined changes in the operational parameters. For example, the display pipeline 36 may adjust image data written to a display pixel 56 based on determined temperature, which may affect perceived luminance of the display pixel. In this manner, the sensing operation may be performed to facilitate improving perceived image quality of displayed image frames.

Figure 12:
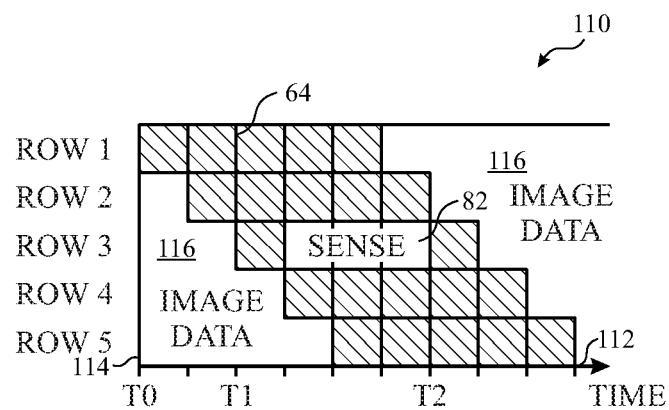
FIG. 12 is a timing diagram describing operation of display pixels based on the process of FIG. 11, in accordance with an embodiment of the present disclosure.

To help illustrate, timing diagram 110, shown in FIG. 12, describes operation of display pixel rows on a display panel 44 when performing the process 90. In particular, the timing diagram 110 represents time on the x-axis 112 and the display pixel rows on the y-axis 114. To simplify explanation, the timing diagram 110 is described with regard to five display pixel rows—namely pixel row 1, pixel row 2, pixel row 3, pixel row 4, and pixel row 5. However, it should be understood that the display panel 44 may include any number of display pixel rows. For example, in some embodiments, the display panel 44 may include 1048 display pixel rows.

With regard to the depicted embodiment, at time $t_0$, pixel row 1 is included in the refresh pixel group 64 and, thus, in a non-light emitting mode. On the other hand, pixel rows 2-5 are illuminated based on image data 116 corresponding to a previous image frame. For the purpose of illustration, the controller 42 may determine a sense pattern that includes sense pixels 82 in pixel row 3. Additionally, the controller 42 may determine that pixel row 3 is to be refreshed at $t_1$.

Thus, when pixel row 3 is to be refreshed at $t_1$, the controller 42 may determine that pixel row 3 includes sense pixels 82. As such, the controller 42 may instruct the display driver 40 to write sensing image data to the sense pixels 82 in pixel row 3 and perform a sensing operation based at least in part on illumination of the sense pixels 82 to facilitate determining operational parameters. After the sensing operation is completed (e.g., at time $t_2$), the controller 42 may instruct the display driver 40 to write image data 116 corresponding with a next image frame to the display pixels 56 in pixel row 3.

Additionally, the controller 42 may determine whether pixel row 3 is the last row in the display panel 44. Since additional pixel rows remain, the controller 42 may instruct the display driver 40 to successively write image data corresponding to the next image frame to the remaining pixel rows. Upon reaching the last pixel row (e.g., pixel row 5), the controller 42 may instruct the display pipeline 36 and/or the display driver 40 to adjust image data written to the display pixels 56 for displaying subsequent image frames based at least in part on the determined operational parameters. For example, when the determined operational parameters indicate that current output from a sense pixel 82 is less than expected, the controller 42 may instruct the display pipeline 36 and/or the display driver 40 to increase current supplied to the display pixels 56 for displaying subsequent image frames. On the other hand, when the determined operational parameters indicate that the current output from the sense pixel is greater than expected, the controller 42 may instruct the display pipeline 36 and/or the display driver 40 to decrease current supplied to the display pixels 56 for displaying subsequent image frames.

It should be noted that the process 90 of FIG. 11 may be used with electronic displays 12 implementing any suitable refresh rate, such as a 60 Hz refresh rate, a 120 Hz refresh rate, and/or a 240 Hz PWM refresh rate. As described above, to increase refresh rate, an electronic display 12 may utilize multiple refresh pixel groups. However, multiple refresh pixel groups may increase timing complexity of the sensing operations, thereby affecting size, power consumption, component count, and/or other implementation associated costs. Thus, to reduce implementation-associated cost, sensing techniques may be adapted when used with multiple non-contiguous refresh pixel groups 64.

Figure 13:
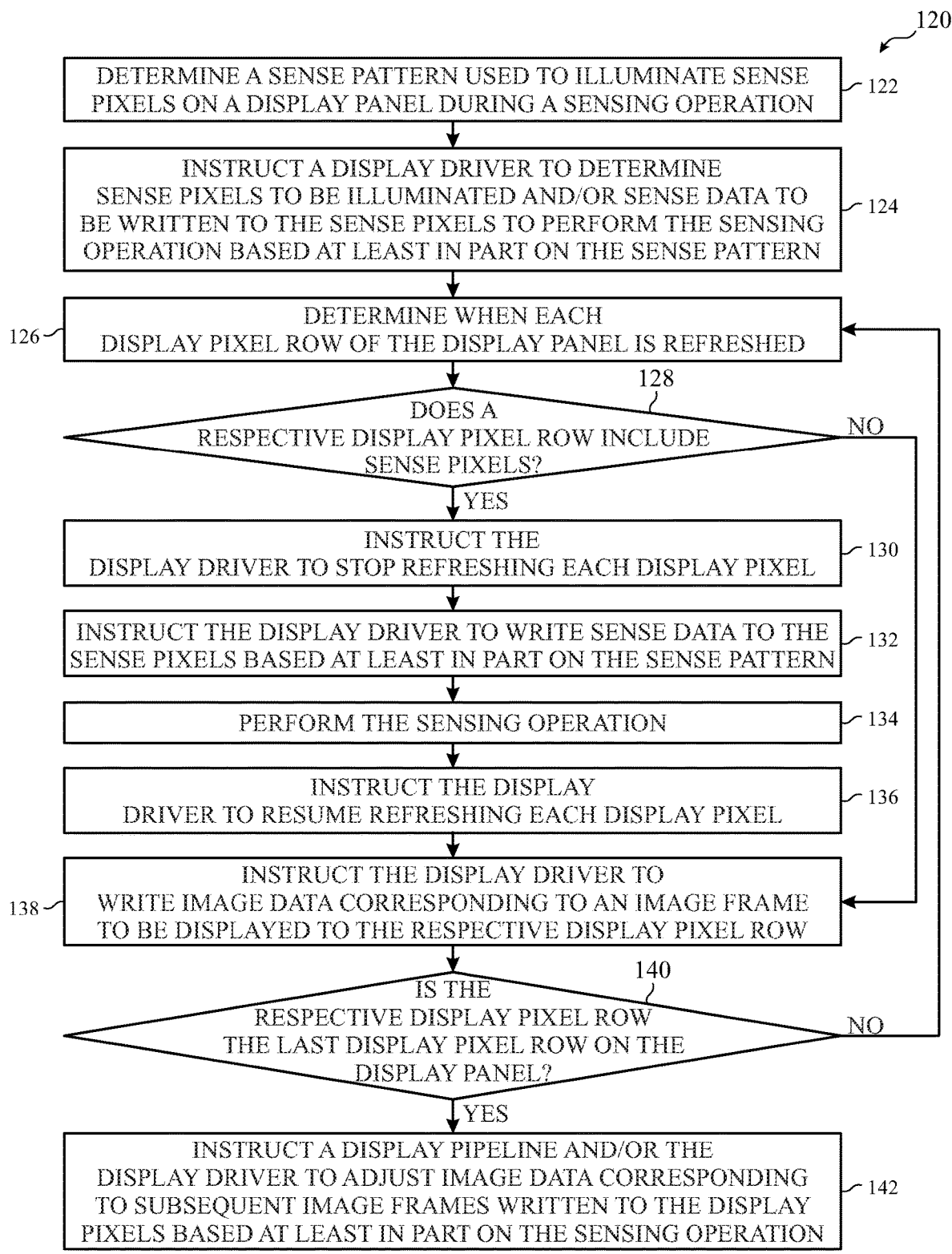
FIG. 13 is a flow diagram of another process for operational parameters using the sense pixels in the refresh pixels while an image frame is displayed, in accordance with an embodiment of the present disclosure.

To help illustrate, a process 120 for sensing (e.g., determining) operational parameters when using multiple non-contiguous refresh pixel groups 64 is described in FIG. 13. Generally, the process 120 includes determining a sense pattern used to illuminate sense pixels 82 during a sensing operation (process block 122), instructing the display driver 40 to determine sense pixels 82 to be illuminated and/or sense data to be written to the sense pixels 82 to perform the sensing operation (process block 124), determining when each display pixel row of the display panel 44 is to be refreshed (process block 126), determining whether a row includes sense pixels 82 (decision block 128), instructing the display driver 40 to stop refreshing each display pixel 56 when the row includes sense pixels 82 (process block 130), instructing the display driver 40 to write sense data to the sense pixels 82 based at least in part on the sense pattern when the row includes sense pixels 82 (process block 132), performing a sensing operation (process block 134), instructing the display driver 40 to resume refreshing each display pixel 56 (process block 136), instructing the display driver 40 to write image data corresponding to an image frame to be displayed to each of the display pixels 56 in the row when the row does not include sense pixels 82 and/or after the sensing operation is performed (process block 138), determining whether the row is the last display pixel row on the display panel 44 (decision block 140), and instructing the display pipeline 36 and/or the display driver 40 to adjust image data corresponding to subsequent image frames written to the display pixels 56 based at least in part on the sensing operation (e.g., determined operational parameters) (process block 108). While the process 120 is described using steps in a specific sequence, it should be understood that the present disclosure contemplates that the describe steps may be performed in different sequences than the sequence illustrated, and certain described steps may be skipped or not performed altogether. In some embodiments, the process 120 may be implemented by executing instructions stored in a tangible, non-transitory, computer-readable medium, such as the controller memory 48, using a processor, such as the controller processor 46.

Accordingly, in some embodiments, the controller 42 may determine a sense pattern used to illuminate sense pixels 82 during a sensing operation (process block 122), as described in process block 92 of the process 90. Based at least in part on the sense pattern, the controller 42 may instruct the display driver 40 to determine sense pixels 82 to be illuminated and/or sense data to be written to the sense pixels 82 to perform a sensing operation (process block 124), as described in process block 94 of the process 90. Additionally, the controller 42 may determine when each display pixel row of the display panel 44 is to be refreshed (process block 126), as described in process block 96 of the process 90. When a row is to be refreshed, the controller 42 may determine whether the row includes sense pixels 82 (decision block 128), as described in decision block 98 of the process 90.

When the row includes sense pixels 82, the controller 42 may instruct the display driver 40 to stop refreshing each display pixel 56, such that the display pixel 56 is not refreshed until the display pixel 56 is instructed to resume refreshing (process block 130). That is, if a display pixel 56 of the display panel 44 is emitting light, or more specifically displaying image data 116, the controller 42 instructs the display pixel 56 to continue emitting light, and continue displaying the image data 116. If the display pixel 56 is not emitting light (e.g., is a refresh pixel 64), the controller 42 instructs the display pixel 56 to continue not emitting light. In some embodiments, the controller 42 may instruct the display pipeline 36 and/or the display driver 40 to instruct the display pixels 56 to stop refreshing until instructed to.

The controller 42 may then instruct the display driver 40 to write sense data to the sense pixels 82 based at least in part on the sense pattern (process block 132), as described in process block 100 of the process 90. The controller 42 may perform the sensing operation (process block 134), as described in process block 102 of the process 90.

The controller 42 may then instruct the display driver 40 to resume refreshing each display pixel 56 (process block 136). The display pixels 56 may then follow the next instruction from the display pipeline 36 and/or the display driver 40.

When the row does not include sense pixels 82 and/or after the sensing operation is performed, the controller 42 may instruct the display driver 40 to write image data corresponding to an image frame to be displayed to each of the display pixels 56 in the row (process block 138), as described in process block 104 of the process 90. Additionally, the controller 42 may determine whether the row is the last display pixel row on the display panel 44 (decision block 140), as described in decision block 106 of the process 90. When not the last row, the controller 42 may continue propagating the refresh pixel group 64 successively through rows of the display panel 44 (process block 126). In this manner, the display pixels 56 may be refreshed (e.g., update) to display the image frame.

On the other hand, when the last row is reached, the controller 42 may instruct the display pipeline 36 and/or the display driver 40 to adjust image data corresponding to subsequent image frames written to the display pixels 56 based at least in part on the sensing operation (e.g., determined operational parameters) (process block 142), as described in process block 108 of the process 90.

Figure 14:
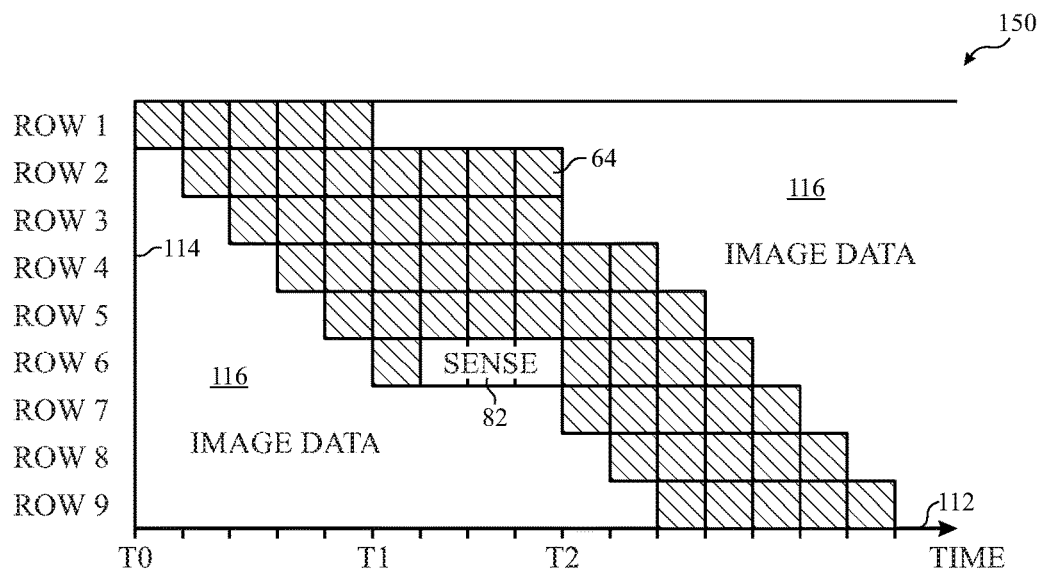
FIG. 14 is a timing diagram describing operation of display pixels based on the process of FIG. 13, in accordance with an embodiment of the present disclosure.

To help illustrate, timing diagram 150, shown in FIG. 14, describes operation of display pixel rows on a display panel 44 when performing the process 120. In particular, the timing diagram 150 represents time on the x-axis 112 and the display pixel rows on the y-axis 114. To simplify explanation, the timing diagram 110 is described with regard to nine display pixel rows—namely pixel row 1, pixel row 2, pixel row 3, pixel row 4, pixel row 5, pixel row 6, pixel row 7, pixel row 8, and pixel row 9. However, it should be understood that the display panel 44 may include any number of display pixel rows. For example, in some embodiments, the display panel 44 may include 1048 display pixel rows.

With regard to the depicted embodiment, at time $t_0$, pixel row 1 is included in the refresh pixel group 64 and, thus, in a non-light emitting mode. On the other hand, pixel rows 2-9 are illuminated based on image data 116 corresponding to a previous image frame. For the purpose of illustration, the controller 42 may determine a sense pattern that includes sense pixels 82 in pixel row 6. Additionally, the controller 42 may determine that pixel row 6 is to be refreshed at $t_1$.

Thus, when pixel row 6 is to be refreshed at $t_1$, the controller 42 may determine that pixel row 6 includes sense pixels 82. As such, the controller 42 may instruct the display driver 40 to stop refreshing each display pixel 56 of the display panel 44, such that the display pixel 56 is not refreshed until the display pixel 56 is instructed to resume refreshing. That is, if a display pixel 56 of the display panel 44 is emitting light, or more specifically displaying image data 116, the controller 42 instructs the display pixel 56 to continue emitting light, and continue displaying the image data 116. If the display pixel 56 is not emitting light (e.g., is a refresh pixel 64), the controller 42 instructs the display pixel 56 to continue not emitting light.

Additionally, the controller 42 may instruct the display driver 40 to write sensing image data to the sense pixels 82 in pixel row 6 and perform a sensing operation based at least in part on illumination of the sense pixels 82 to facilitate determining operational parameters. After the sensing operation is completed (e.g., at time $t_2$), the controller 42 may instruct the display driver 40 to resume refreshing each display pixel 56. The display pixels 56 may then follow the next instruction from the display pipeline 36 and/or the display driver 40. The controller 42 may then instruct the display driver 40 to write image data 116 corresponding with a next image frame to the display pixels 56 in pixel row 6.

The controller 42 may then determine whether pixel row 6 is the last row in the display panel 44. Since additional pixel rows remain, the controller 42 may instruct the display driver 40 to successively write image data corresponding to the next image frame to the remaining pixel rows. Upon reaching the last pixel row (e.g., pixel row 9), the controller 42 may instruct the display pipeline 36 and/or the display driver 40 to adjust image data written to the display pixels 56 for displaying subsequent image frames based at least in part on the determined operational parameters. For example, when the determined operational parameters indicate that current output from a sense pixel 82 is less than expected, the controller 42 may instruct the display pipeline 36 and/or the display driver 40 to increase current supplied to the display pixels 56 for displaying subsequent image frames. On the other hand, when the determined operational parameters indicate that the current output from the sense pixel is greater than expected, the controller 42 may instruct the display pipeline 36 and/or the display driver 40 to decrease current supplied to the display pixels 56 for displaying subsequent image frames.

It should be noted that the process 120 of FIG. 13 may be used with electronic displays 12 implementing any suitable refresh rate, such as a 60 Hz refresh rate, a 120 Hz refresh rate, and/or a 240 Hz PWM refresh rate. As described above, to increase refresh rate, an electronic display 12 may utilize multiple refresh pixel groups. However, multiple refresh pixel groups may increase timing complexity of the sensing operations, thereby affecting size, power consumption, component count, and/or other implementation associated costs. Thus, to reduce implementation-associated cost, sensing techniques may be adapted when used with multiple non-contiguous refresh pixel groups 64.

Figure 15:
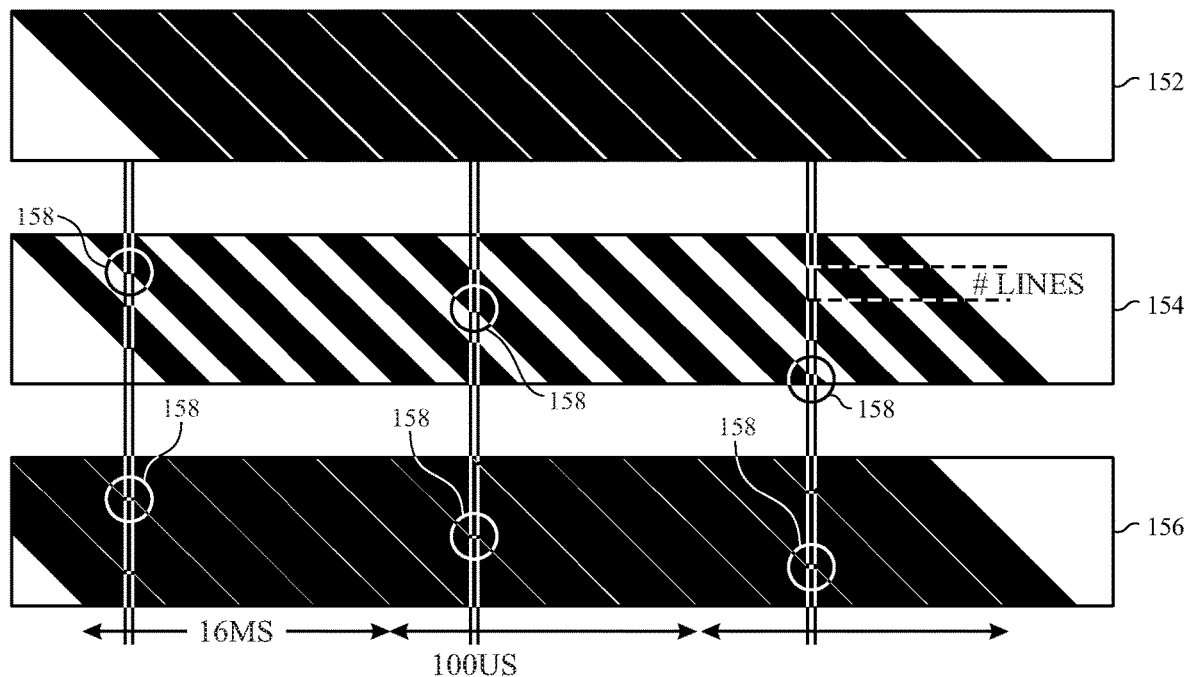
FIG. 15 is a timing diagram describing operation of display pixels utilizing multiple refresh pixel groups based on the process of FIG. 13, in accordance with an embodiment of the present disclosure.

To help illustrate, FIG. 15 includes three graphs 152, 154, 156 illustrating timing during operation of display pixels 56 utilizing multiple refresh pixel groups based on the process 120 of FIG. 13, in accordance with an embodiment of the present disclosure. The first graph 152 illustrates operation of display pixels 56 utilizing multiple refresh pixel groups without a sensing operation, the second graph 154 illustrates operation of display pixels 56 utilizing multiple refresh pixel groups during a sensing operation with a greater number of sense pixel rows, and the third graph 156 illustrates operation of display pixels 56 utilizing multiple refresh pixel groups during a sensing operation with a fewer number of sense pixel rows. As illustrated, each display pixel 56 is instructed to stop refreshing (as shown by 158) when a respective display pixel row includes the sense pixels 82. After the sensing operation is completed, each display pixel 56 is instructed to resume refreshing.

The process 120 enables the controller 42 to sense environmental operational parameters and/or display-related operational parameters using sense pixels 82 in a refresh pixel group 64 displayed by the display panel 44. Because the sensing time does not fit into a duration of a refresh operation that does not include sense pixels 82, such that the duration of the refresh operation is unaltered, the circuitry used to implement the method 120 may be simpler, use fewer components, and be more appropriate for applications where saving space in the display panel 44 is a priority. It should be noted, however, that because the majority of display pixels 56 of the display panel 44 are emitting light (e.g., displaying the image data 116) rather than not emitting light, performing the method 120 may increase average luminance during sensing. In particular, stopping the display pixels 56 of the display panel 44 from refreshing during the sensing time may freeze a majority of display pixels 56 that are emitting light, which may increase perceivability of the sensing. As such, perceivability, via a change in average luminance of the display panel 44, may vary with the number of display pixels 56 emitting light and/or displaying image data 116.

Figure 16:
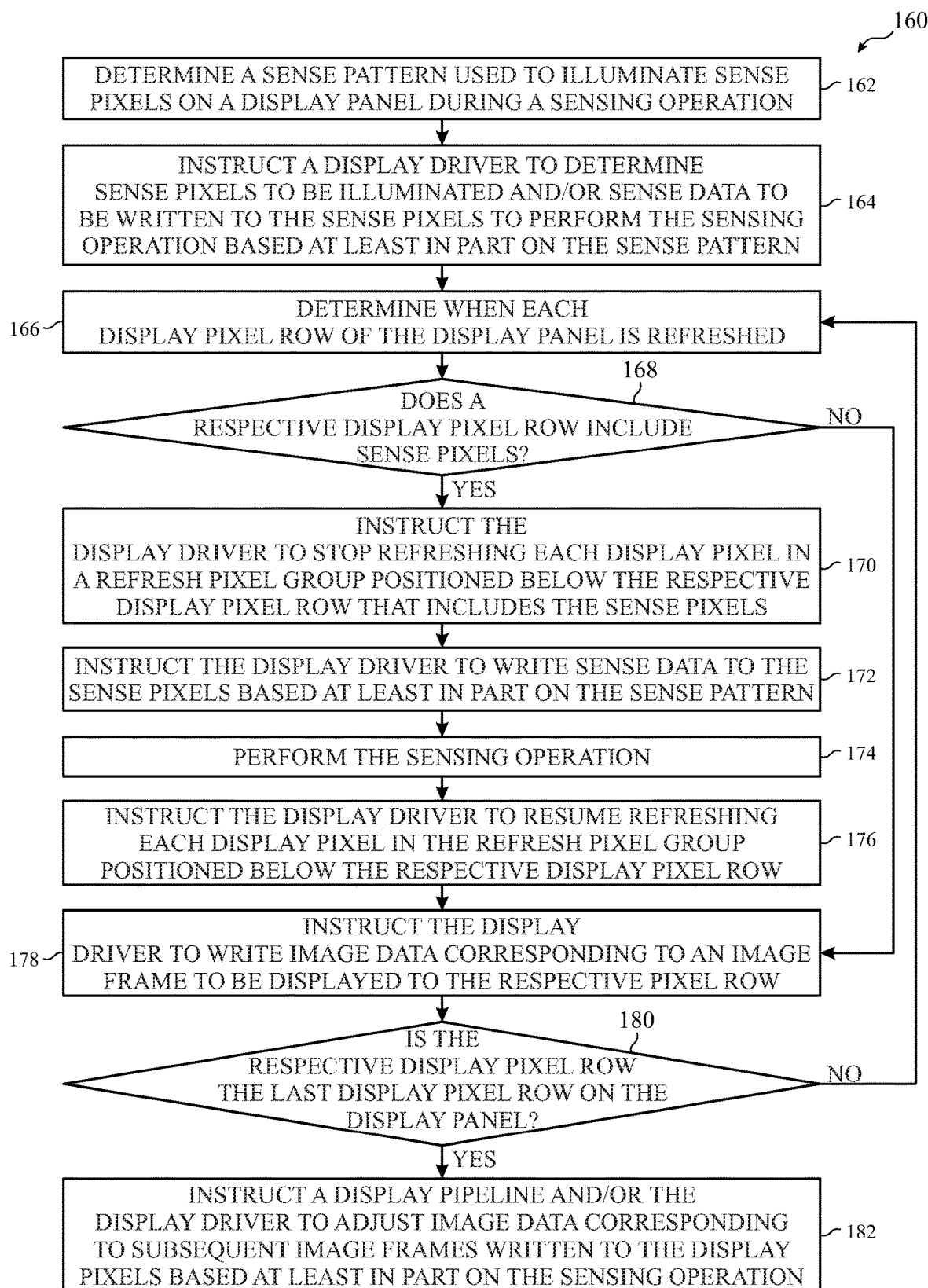
FIG. 16 is a flow diagram of another process for sensing operational parameters using the sense pixels in the refresh pixels while an image frame is displayed, in accordance with an embodiment of the present disclosure.

FIG. 16 is a flow diagram of a method 160 for sensing environmental and/or operational information using the sense pixels 82 in the refresh pixel group 64 of a frame displayed by the display panel 44, in accordance with an embodiment of the present disclosure. Generally, the process 160 includes determining a sense pattern used to illuminate sense pixels 82 during a sensing operation (process block 162), instructing the display driver 40 to determine sense pixels 82 to be illuminated and/or sense data to be written to the sense pixels 82 to perform the sensing operation (process block 164), determining when each display pixel row of the display panel 44 is to be refreshed (process block 166), determining whether a respective display pixel row includes sense pixels 82 (decision block 168), instructing the display driver 40 to stop refreshing each display pixel 56 in a refresh pixel group 64 positioned below the respective display pixel row that includes the sense pixels 82 when the row includes sense pixels 82 (process block 170), instructing the display driver 40 to write sense data to the sense pixels 82 based at least in part on the sense pattern when the row includes sense pixels 82 (process block 172), performing a sensing operation (process block 174), instructing the display driver 40 to resume refreshing each display pixel 56 in the refresh pixel group (process block 176), instructing the display driver 40 to write image data corresponding to an image frame to be displayed to each of the display pixels 56 in the row when the row does not include sense pixels 82 and/or after the sensing operation is performed (process block 178), determining whether the row is the last display pixel row on the display panel 44 (decision block 180), and instructing the display pipeline 36 and/or the display driver 40 to adjust image data corresponding to subsequent image frames written to the display pixels 56 based at least in part on the sensing operation (e.g., determined operational parameters) (process block 182). While the process 160 is described using steps in a specific sequence, it should be understood that the present disclosure contemplates that the describe steps may be performed in different sequences than the sequence illustrated, and certain described steps may be skipped or not performed altogether. In some embodiments, the process 160 may be implemented by executing instructions stored in a tangible, non-transitory, computer-readable medium, such as the controller memory 48, using a processor, such as the controller processor 46.

Accordingly, in some embodiments, the controller 42 may determine a sense pattern used to illuminate sense pixels 82 during a sensing operation (process block 162), as described in process block 92 of the process 90. Based at least in part on the sense pattern, the controller 42 may instruct the display driver 40 to determine sense pixels 82 to be illuminated and/or sense data to be written to the sense pixels 82 to perform a sensing operation (process block 164), as described in process block 94 of the process 90. Additionally, the controller 42 may determine when each display pixel row of the display panel 44 is to be refreshed (process block 166), as described in process block 96 of the process 90. When a row is to be refreshed, the controller 42 may determine whether the row includes sense pixels 82 (decision block 168), as described in decision block 98 of the process 90.

When the row includes sense pixels 82, the controller 42 may instruct the display driver 40 to stop refreshing each display pixel 56 in a refresh pixel group 64 positioned below the row that includes the sense pixels 82, such that the display pixel 56 in the refresh pixel group 64 positioned below the row is not refreshed until the display pixel 56 is instructed to resume refreshing (process block 170). That is, if a display pixel 56 of the display panel 44 in the refresh pixel group 64 positioned below the row is emitting light, or more specifically displaying image data 116, the controller 42 instructs the display pixel 56 to continue emitting light, and continue displaying the image data 116. If the display pixel 56 in the refresh pixel group 64 positioned below the row is not emitting light (e.g., is a refresh pixel 64), the controller 42 instructs the display pixel 56 to continue not emitting light. In some embodiments, the controller 42 may instruct the display pipeline 36 and/or the display driver 40 to instruct the display pixels 56 to stop refreshing until instructed to.

The controller 42 may then instruct the display driver 40 to write sense data to the sense pixels 82 based at least in part on the sense pattern (process block 172), as described in process block 100 of the process 90. The controller 42 may perform the sensing operation (process block 174), as described in process block 102 of the process 90.

The controller 42 may then instruct the display driver 40 to resume refreshing each display pixel 56 in the refresh pixel group 64 positioned below the row that includes the sense pixels 82 in the refresh pixel group (process block 176). The display pixels 56 in the refresh pixel group 64 positioned below the row may then follow the next instruction from the display pipeline 36 and/or the display driver 40.

When the row does not include sense pixels 82 and/or after the sensing operation is performed, the controller 42 may instruct the display driver 40 to write image data corresponding to an image frame to be displayed to each of the display pixels 56 in the row (process block 178), as described in process block 104 of the process 90. Additionally, the controller 42 may determine whether the row is the last display pixel row on the display panel 44 (decision block 180), as described in decision block 106 of the process 90. When not the last row, the controller 42 may continue propagating the refresh pixel group 64 successively through rows of the display panel 44 (process block 166). In this manner, the display pixels 56 may be refreshed (e.g., update) to display the image frame.

On the other hand, when the last row is reached, the controller 42 may instruct the display pipeline 36 and/or the display driver 40 to adjust image data corresponding to subsequent image frames written to the display pixels 56 based at least in part on the sensing operation (e.g., determined operational parameters) (process block 182), as described in process block 108 of the process 90.

Figure 17:
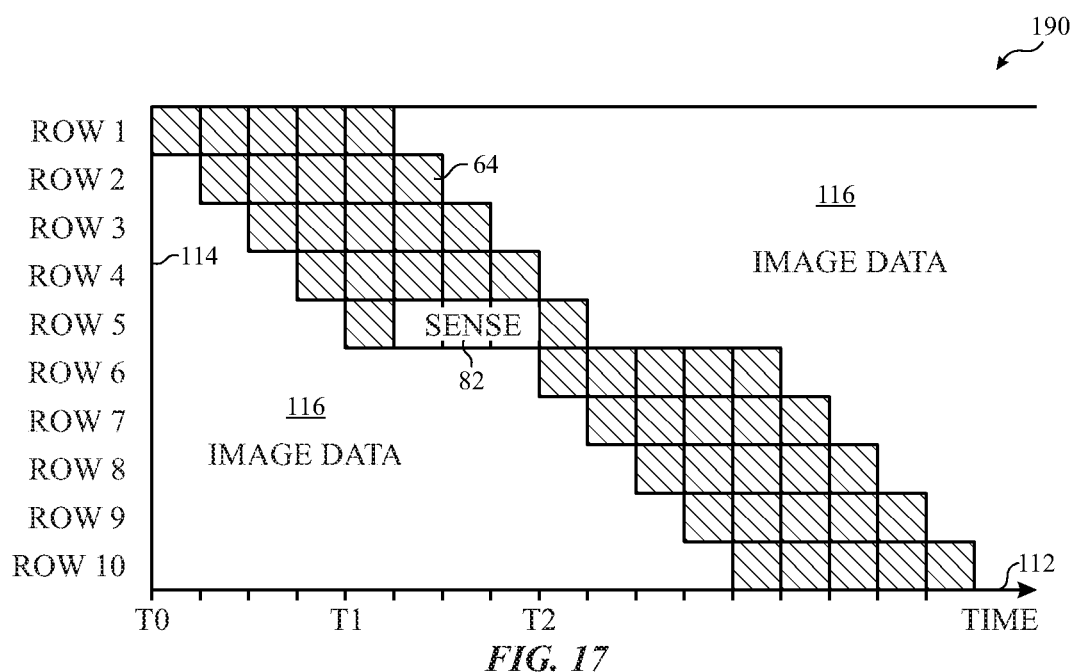
FIG. 17 is a timing diagram describing operation of display pixels based on the process of FIG. 16, in accordance with an embodiment of the present disclosure.

To help illustrate, timing diagram 190, shown in FIG. 17, describes operation of display pixel rows on a display panel 44 when performing the process 160. In particular, the timing diagram 190 represents time on the x-axis 112 and the display pixel rows on the y-axis 114. To simplify explanation, the timing diagram 110 is described with regard to ten display pixel rows—namely pixel row 1, pixel row 2, pixel row 3, pixel row 4, pixel row 5, pixel row 6, pixel row 7, pixel row 8, pixel row 9, and pixel row 10. However, it should be understood that the display panel 44 may include any number of display pixel rows. For example, in some embodiments, the display panel 44 may include 1048 display pixel rows.

With regard to the depicted embodiment, at time $t_0$, pixel row 1 is included in the refresh pixel group 64 and, thus, in a non-light emitting mode. On the other hand, pixel rows 2-10 are illuminated based on image data 116 corresponding to a previous image frame. For the purpose of illustration, the controller 42 may determine a sense pattern that includes sense pixels 82 in pixel row 5. Additionally, the controller 42 may determine that pixel row 5 is to be refreshed at $t_1$.

Thus, when pixel row 5 is to be refreshed at $t_1$, the controller 42 may determine that pixel row 5 includes sense pixels 82. As such, the controller 42 may instruct the display driver 40 to stop refreshing each display pixel 56 in the refresh pixel group 64 positioned below pixel row 5, such that the display pixel 56 in the refresh pixel group 64 positioned below pixel row 5 is not refreshed until the display pixel 56 is instructed to resume refreshing. That is, if a display pixel 56 in the refresh pixel group 64 positioned below pixel row 5 is emitting light, or more specifically displaying image data 116, the controller 42 instructs the display pixel 56 to continue emitting light, and continue displaying the image data 116. If the display pixel 56 in the refresh pixel group 64 positioned below pixel row 5 is not emitting light (e.g., is a refresh pixel 64), the controller 42 instructs the display pixel 56 to continue not emitting light.

Additionally, the controller 42 may instruct the display driver 40 to write sensing image data to the sense pixels 82 in pixel row 5 and perform a sensing operation based at least in part on illumination of the sense pixels 82 to facilitate determining operational parameters. After the sensing operation is completed (e.g., at time $t_2$), the controller 42 may instruct the display driver 40 to resume refreshing each display pixel 56 in the refresh pixel group 64 positioned below pixel row 5. The display pixels 56 in the refresh pixel group 64 positioned below pixel row 5 may then follow the next instruction from the display pipeline 36 and/or the display driver 40. The controller 42 may then instruct the display driver 40 to write image data 116 corresponding with a next image frame to the display pixels 56 in pixel row 5.

The controller 42 may then determine whether pixel row 5 is the last row in the display panel 44. Since additional pixel rows remain, the controller 42 may instruct the display driver 40 to successively write image data corresponding to the next image frame to the remaining pixel rows. Upon reaching the last pixel row (e.g., pixel row 10), the controller 42 may instruct the display pipeline 36 and/or the display driver 40 to adjust image data written to the display pixels 56 for displaying subsequent image frames based at least in part on the determined operational parameters. For example, when the determined operational parameters indicate that current output from a sense pixel 82 is less than expected, the controller 42 may instruct the display pipeline 36 and/or the display driver 40 to increase current supplied to the display pixels 56 for displaying subsequent image frames. On the other hand, when the determined operational parameters indicate that the current output from the sense pixel is greater than expected, the controller 42 may instruct the display pipeline 36 and/or the display driver 40 to decrease current supplied to the display pixels 56 for displaying subsequent image frames.

It should be noted that the process 160 of FIG. 16 may be used with electronic displays 12 implementing any suitable refresh rate, such as a 60 Hz refresh rate, a 120 Hz refresh rate, and/or a 240 Hz PWM refresh rate. As described above, to increase refresh rate, an electronic display 12 may utilize multiple refresh pixel groups. However, multiple refresh pixel groups may increase timing complexity of the sensing operations, thereby affecting size, power consumption, component count, and/or other implementation associated costs. Thus, to reduce implementation-associated cost, sensing techniques may be adapted when used with multiple non-contiguous refresh pixel groups 64.

Figure 18:
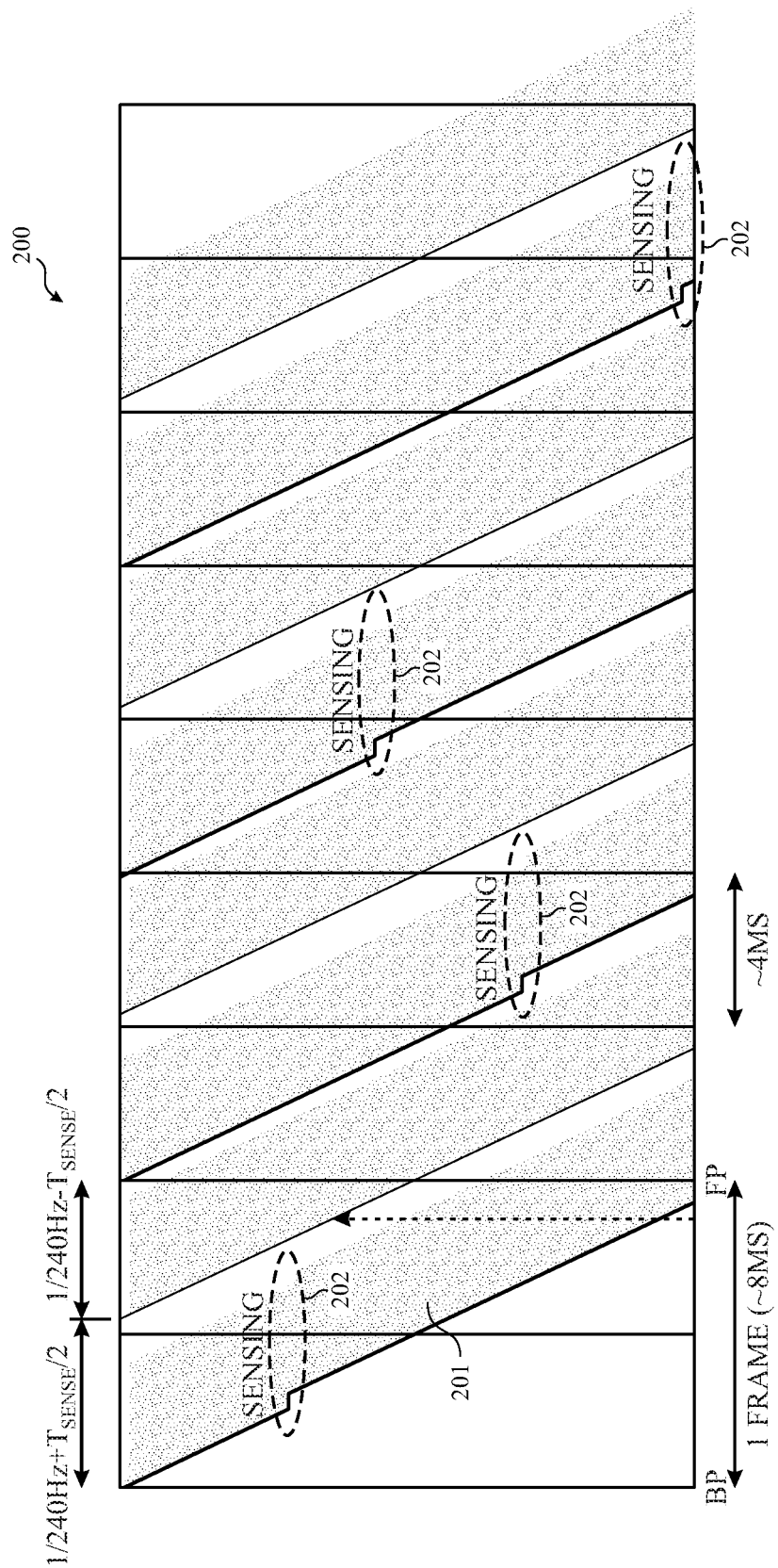
FIG. 18 is a timing diagram describing operation of display pixels utilizing multiple refresh pixel groups based on the process of FIG. 16, in accordance with an embodiment of the present disclosure.

To help illustrate, FIG. 18 is a graph 200 illustrating timing during operation of display pixels 56 utilizing multiple refresh pixel groups based on the process 160 of FIG. 16, in accordance with an embodiment of the present disclosure. As illustrated, when a respective display pixel row of an image frame 201 includes the sense pixels 82, each display pixel 56 in a respective refresh pixel group 64 positioned below the respective display pixel row is instructed to stop refreshing (e.g., during an intra frame pausing sensing period 202). After the sensing operation is completed, each display pixel 56 in the respective refresh pixel group 64 positioned below the respective display pixel row in the refresh pixel group is instructed to resume refreshing. Because it may be desirable to avoid multiple contiguous refresh pixel groups 64 to avoid perceivability of sensing operations, a subsequent refresh pixel group may be phase-shifted forward in time (e.g., by half of a sensing period). In this manner, a refresh pixel group may avoid abutting a subsequent refresh pixel group.

Figure 19:
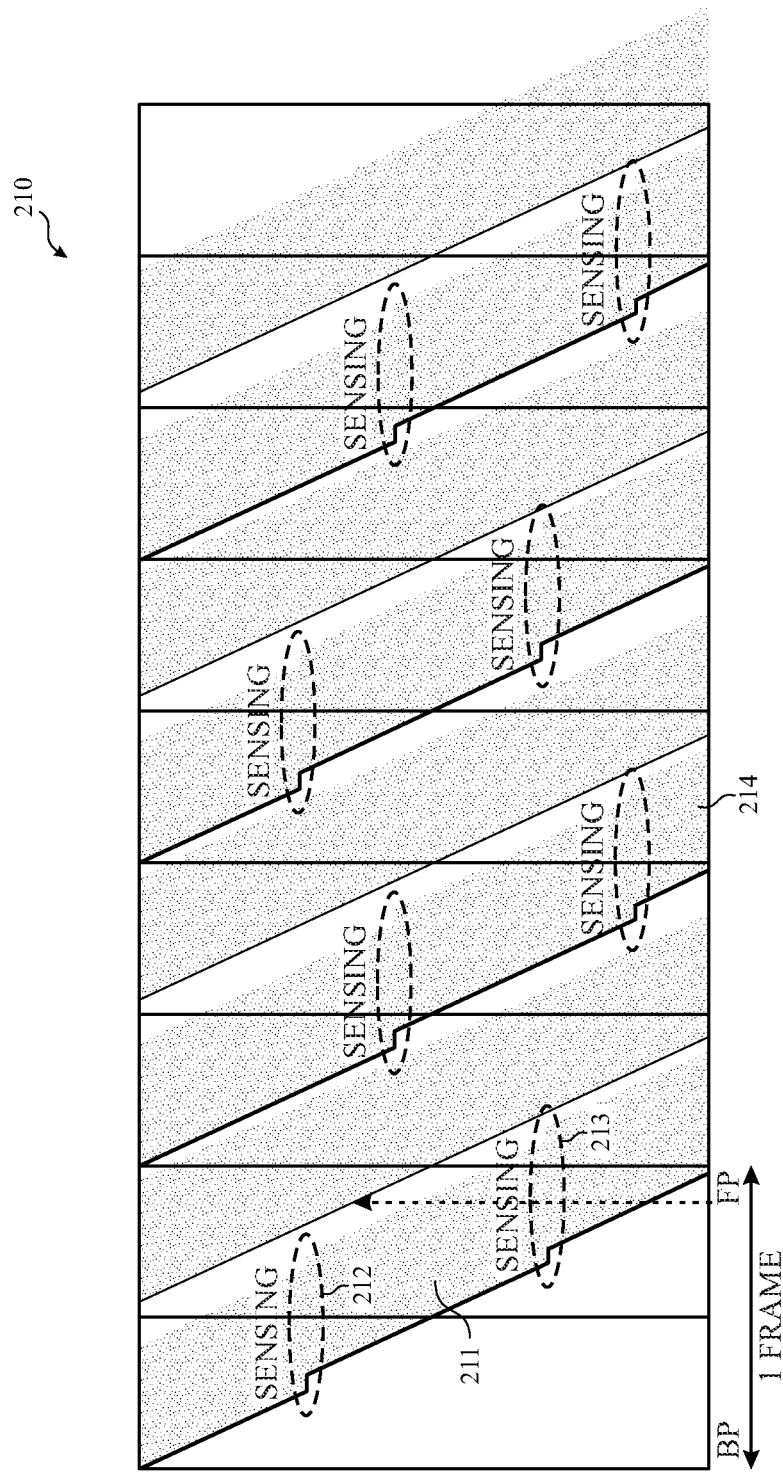
FIG. 19 is a graph of image frames that include multiple intra frame pausing sensing periods, in accordance with an embodiment of the present disclosure.

The graph 190 of FIG. 18 illustrates a single intra frame pausing sensing period 202 for the image frame 201. In some embodiments, the image frame 201 may include multiple intra frame pausing sensing periods. To help illustrate, FIG. 19 is a graph 210 of image frames 211 that include multiple intra frame pausing sensing periods 212, 213, in accordance with an embodiment of the present disclosure. As illustrated, when a respective display pixel row of the image frame 211 includes a first set of sense pixels 82, each display pixel 56 in a respective refresh pixel group 64 positioned below the respective display pixel row is instructed to stop refreshing (e.g., during a first intra frame pausing sensing period 212). After the sensing operation is completed, each display pixel 56 in the respective refresh pixel group 64 positioned below the respective display pixel row in the refresh pixel group is instructed to resume refreshing. Moreover, when a subsequent respective display pixel row of the image frame 211 includes a second set of sense pixels 82, each display pixel 56 in a respective refresh pixel group 64 positioned below the subsequent respective display pixel row is instructed to stop refreshing (e.g., during a second intra frame pausing sensing period 213). Again, because it may be desirable to avoid multiple contiguous refresh pixel groups 64 to avoid perceivability of sensing operations, a subsequent refresh pixel group may be phase-shifted forward in time (e.g., by half of a sensing period). In this manner, a refresh pixel group may avoid abutting a subsequent refresh pixel group. Additionally, intervals between multiple intra frame pausing sensing periods (e.g., the first and second intra frame pausing sensing periods 212, 213) in a single image frame 211 may be fixed or variable. Moreover, each intra frame pausing sensing period (e.g., 212, 213) in the single image frame may have same or different durations. While two intra frame pausing sensing periods (e.g., 212, 213) are shown in image frames (e.g., 211, 214) of the graph 210 of FIG. 19, it should be understood that any suitable number of intra frame pausing sensing periods in an image frame is contemplated. Moreover, the number of intra frame pausing sensing periods, the interval between the intra frame pausing sensing periods, and the duration of the intra frame pausing sensing periods, may be fixed or variable from image frame (e.g., 211) to image frame (e.g., 214).

The process 160 enables the controller 42 to sense environmental operational parameters and/or display-related operational parameters using sense pixels 82 in a refresh pixel group 64 displayed by the display panel 44. Because the sensing time does not fit into a duration of a refresh operation that does not include sense pixels 82, such that the duration of the refresh operation is unaltered, the circuitry used to implement the method 160 may be simpler, use fewer components, and be more appropriate for embodiments where saving space is a priority. Additionally, because only the display pixels 56 in a refresh pixel group 64 positioned below the respective display pixel row that includes the one or more sense pixels 82 are paused, while the display pixels 56 positioned above the respective display pixel row that includes the one or more sense pixels 82 continue to operate normally, all display pixels 56 of the display panel 44 are not "paused," and as such, performing the method 160 may maintain average luminance during sensing.

As a result, during sensing, the instantaneous luminance of the display panel 44 may vary due to the display pixels 56 in a refresh pixel group 64 positioned below the respective display pixel row that includes the one or more sense pixels 82 not refreshing. As such, perceivability, via a change in instantaneous luminance of the display panel 44, may vary with the number of display pixels 56 in the refresh pixel group 64 positioned below the pixel row that includes the one or more sense pixels 82 that are emitting light and/or displaying image data 116.

Accordingly, the technical effects of the present disclosure include sensing environmental and/or operational information within a refresh pixel group of a frame displayed by an electronic display. In this manner, perceivability of the sensing may be reduced. In some embodiments, a total time that a first display pixel row includes a continuous block of refresh pixels is the same as a total time used for a second display pixel row to illuminate a continuous block of refresh pixels and sense pixels. In some embodiments, during sensing, each pixel of the display panel is instructed to stop refreshing. As such, a total time that a first display pixel row includes a continuous block of refresh pixels, wherein the first display pixel row is not instructed to stop refreshing at a time when the first display pixel row includes a refresh pixel, is less than a total time that a second display pixel row includes a continuous block of the refresh pixels and the sense pixels. Additionally, in some embodiments, during sensing, each pixel of the display panel in a refresh pixel group positioned below a respective display pixel row that includes the sense pixels is instructed to stop refreshing. As such, a total time that a first display pixel row includes a continuous block of refresh pixels is the same as a total time used for a second display pixel row to illuminate a continuous block of refresh pixels and sense pixels.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method for operating an electronic display, comprising:
   receiving, using a controller, ambient light conditions;
   determining, using the controller, a sense pattern to be used to illuminate a plurality of sense pixels of at least one row of pixels of the electronic display based at least in part on the ambient light conditions;
   instructing, using the controller, a display driver to write sense data to the plurality of sense pixels based at least in part on the sense pattern;
   instructing, using the controller, a display panel to illuminate the plurality of sense pixels based at least in part on the sense data;
   receiving, using the controller, sensor data related to operational parameters of the electronic display based at least in part on illuminating the plurality of sense pixels, wherein a first set of pixels below the at least one row of pixels renders a portion of a first image frame of the display content and a second set of pixels above the at least one row of pixels renders a portion of a second image frame of the display content; and
   adjusting, using the controller, image display on the electronic display based at least in part on the sensor data.

2. The method of claim 1, wherein determining, using the controller, the sense pattern used to illuminate the plurality of sense pixels is based at least in part on the display content.

3. The method of claim 1, comprising determining, using the controller, whether the at least one row of pixels comprises at least one sense pixel of the plurality of sense pixels.

4. The method of claim 1, wherein the sensor data is provided by one or more sensors when the plurality of sense pixels is illuminated.

5. The method of claim 1, comprising analyzing, using the controller, the sensor data to determine the operational parameters.

6. The method of claim 1, instructing, using the controller, the display driver to refresh the at least one row of pixels by writing image data of the first image frame to each pixel in the at least one row of pixels.

7. The method of claim 1, wherein adjusting, using the controller, image display comprises adjusting display of a subsequent image frame based at least in part on the sensor data.

8. A tangible, non-transitory, computer-readable medium that stores instructions executable by one or more processors in an electronic device, wherein the instructions comprise instructions to:
   receive ambient light conditions;
   determine a sense pattern to be used to illuminate a plurality of sense pixels of at least one row of pixels of an electronic display of the electronic device based at least in part on the ambient light conditions;
   instruct a display driver to write sense data to the plurality of sense pixels based at least in part on the sense pattern;
   instruct a display panel to illuminate the plurality of sense pixels based at least in part on the sense data;
   receive operational parameters of the electronic display based at least in part on illuminating the plurality of sense pixels, wherein a first set of pixels below the at least one row of pixels renders a portion of a first image frame and a second set of pixels above the at least one row of pixels renders a portion of a second image frame; and
   adjust image display of a third image frame on the electronic display based at least in part on the operational parameters.

9. The computer-readable medium of claim 8, wherein the operational parameters are based at least in part on sensor data provided by one or more sensors when the plurality of sense pixels is illuminated.

10. The computer-readable medium of claim 8, comprising instructions to:
    instruct the display driver to stop refreshing each pixel of the electronic display; and
    instruct the display driver to resume refreshing each pixel of the electronic display.

11. The computer-readable medium of claim 8, comprising instructions to:
    instruct the display driver to stop refreshing each pixel in a refresh pixel group of the electronic display positioned below the at least one row of pixels when the refresh pixel group and the at least one row of pixels comprise the sense pixel; and
    instruct the display driver to resume refreshing each pixel in the refresh pixel group positioned below the at least one row of pixels.

12. An electronic device, comprising:
    a display pipeline configured to receive image data corresponding with a first image frame to be displayed from an image data source;
    an electronic display configured to display the first image frame, wherein the electronic display comprises:
        a display panel comprising at least one pixel row; and
        a display driver communicatively coupled to the display pipeline, wherein the display driver is configured to refresh the at least one pixel row by writing image data corresponding to the first image frame to the at least one pixel row; and
    a controller communicatively coupled to the display pipeline and a sensor, wherein the controller is configured to:
        receive ambient light conditions;
        determine a sense pattern to be used to illuminate a plurality of sense pixels of the at least one row of pixels based at least in part on the ambient light conditions;
        instruct the display driver to write sense data to the plurality of sense pixels based at least in part on the sense pattern;
        instruct the display panel to illuminate the plurality of sense pixels based at least in part on the sense data;
        receive sensor data from the sensor related to operational parameters of the electronic display based at least in part on illuminating the plurality of sense pixels of the at least one pixel row, wherein a first set of pixels below the at least one pixel row renders a portion of the first image frame and a second set of pixels above the at least one pixel row renders a portion of a second image frame; and
        adjust image display on the display panel based at least in part on the sensor data.

13. The electronic device of claim 12, wherein the sensor data comprises ambient temperature, humidity, brightness, or any combination thereof.

14. The electronic device of claim 12, wherein the sensor data comprises an amount of light emission from at least one display pixel of the electronic display, an amount of current at the at least one display pixel, or any combination thereof.

15. The electronic device of claim 12, wherein the display panel comprises a second display pixel row that does not include at least one sense pixel of the plurality of sense pixels.

16. The electronic device of claim 12, wherein the controller is configured to:
   instruct the display driver to stop refreshing each pixel of the display panel; and
   instruct the display driver to resume refreshing each pixel of the display panel.

17. The electronic device of claim 12, wherein the controller is configured to:
   instruct the display driver to stop refreshing each pixel in a refresh pixel group of the display panel positioned below the at least one pixel row when the refresh pixel group and the at least one pixel row comprise the sense pixel; and
   instruct the display driver to resume refreshing each pixel in the refresh pixel group positioned below the at least one pixel row.

18. The electronic device of claim 12, wherein the controller is configured to determine brighter sense patterns for dimmer ambient light conditions, and determine dimmer sense patterns for brighter ambient light conditions.

19. The electronic device of claim 12, wherein the controller is configured to determine more solid sense patterns for dimmer ambient light conditions, and determine less solid sense patterns for brighter ambient light conditions.

* * * * *